(12) United States Patent
Turner et al.

(10) Patent No.: US 9,609,485 B2
(45) Date of Patent: Mar. 28, 2017

(54) PREDICTING COMPANION DATA TYPES ASSOCIATED WITH A TRAVELER AT A GEOGRAPHIC REGION INCLUDING LODGING

(71) Applicant: HomeAway, Inc, Austin, TX (US)

(72) Inventors: Ryan Hedley Turner, Austin, TX (US); Daniel Steven Haligas, Panama City, FL (US); Velayudhan Pillai Venugopal, Austin, TX (US); Alex Holm Devine, Austin, TX (US)

(73) Assignee: HomeAway, Inc., Austin, TX (US)

( * ) Notice: Subject to any disclaimer, the term of this patent is extended or adjusted under 35 U.S.C. 154(b) by 0 days.

(21) Appl. No.: 14/564,059

(22) Filed: Dec. 8, 2014

(65) Prior Publication Data

US 2016/0165403 A1    Jun. 9, 2016

(51) Int. Cl.
*H04W 4/02* (2009.01)
*H04L 12/58* (2006.01)
*G06Q 10/02* (2012.01)

(52) U.S. Cl.
CPC ............ *H04W 4/028* (2013.01); *G06Q 10/02* (2013.01); *H04L 51/046* (2013.01)

(58) Field of Classification Search
None
See application file for complete search history.

(56) References Cited

U.S. PATENT DOCUMENTS

| 8,855,681 | B1 | 10/2014 | George et al. |
| 9,208,005 | B2* | 12/2015 | Agarwal ................. G06F 11/00 |
| 2002/0111172 | A1 | 8/2002 | DeWolf et al. |
| 2008/0222287 | A1* | 9/2008 | Bahl ................... H04L 41/5058 709/224 |
| 2010/0027527 | A1* | 2/2010 | Higgins ................. H04W 4/18 370/351 |

\* cited by examiner

*Primary Examiner* — Diane Mizrahi
(74) *Attorney, Agent, or Firm* — Knobbe, Martens, Olson & Bear, LLP

(57) ABSTRACT

Various embodiments relate generally to electrical and electronic hardware, computer software, wired and wireless network communications, and wearable computing devices for identifying activities and/or destinations of relative importance. More specifically, a system, a device and a method are provided to predict a type of companion with whom a traveler collaborates to, among other things, predict activities (e.g., preferential activities) available at a geographic region association with lodging. In one or more embodiments, a method can include determining a location at which a user computing device associated with a user is disposed, and calculating that a computing device associated with a candidate companion is within a region coterminous with the location. Also, the method may include predicting data representing a companionship type for data representing the candidate companion based at least the location at which the user and the candidate companion are co-located.

18 Claims, 19 Drawing Sheets

PREDICTING COMPANION DATA TYPES ASSOCIATED WITH A TRAVELER AT A GEOGRAPHIC REGION INCLUDING LODGING

CO-RELATED APPLICATIONS

This application is a Continuation-in-Part ("CIP") non-provisional patent application claiming priority to U.S. patent application Ser. No. 14/562,629 filed on Dec. 5, 2014, entitled "Adaptive Advisory Engine and Methods to Predict Preferential Activities Available at a Region Associated with Lodging," which is herein incorporated by reference.

FIELD

Various embodiments relate generally to electrical and electronic hardware, computer software, wired and wireless network communications, and wearable computing devices for identifying activities and/or destinations of relative importance. More specifically, a system, a device and a method are provided to predict a type of companion with whom a traveler collaborates to, among other things, predict activities (e.g., preferential activities) available at a geographic region association with lodging.

BACKGROUND

A vacation rental marketplace in which disparate owners of second or vacation homes has experienced increasing growth recently. In a vacation rental marketplace, a family or a group of people (e.g., group of friends) may rent anything from cabins, condominiums, summer homes, to villas, barns, farm houses, and castles. These types of rental properties are desirable as typical hotel or motel buildings are not well-suited to accommodate families or groups of people, and are usually less private and less comforting to some guests.

With the advent of networked computing devices, facilitating the renting of properties electronically has enabled travelers to more readily enjoy the experiences of renting others' homes. However, conventional techniques and known technological solutions have been sub-optimal in guiding or navigating travelers to desired activities. Further, conventional computing devices in traditional vacation rental marketplaces are not well-suited to provide sufficient information to travelers regarding activities in a local in which a rental property is located. Another drawback to conventional rental marketplaces is that concierge-like services for guests may be somewhat limited or negligible due to the lack of computing and/or administrative resources. Other drawbacks to conventional techniques and known technological solutions include limited use of certain types of data that may be useful to enhancing a travel experience for a traveler.

While conventional approaches are functional, the usual structures and/or functionalities for renting properties are not well-suitable to the increasing technological demands required to optimally guide and/or service the predilections of travelers effectively. Thus, what is needed is a solution for channelizing a participant to desired activities in association with a computerized rental system effectively without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
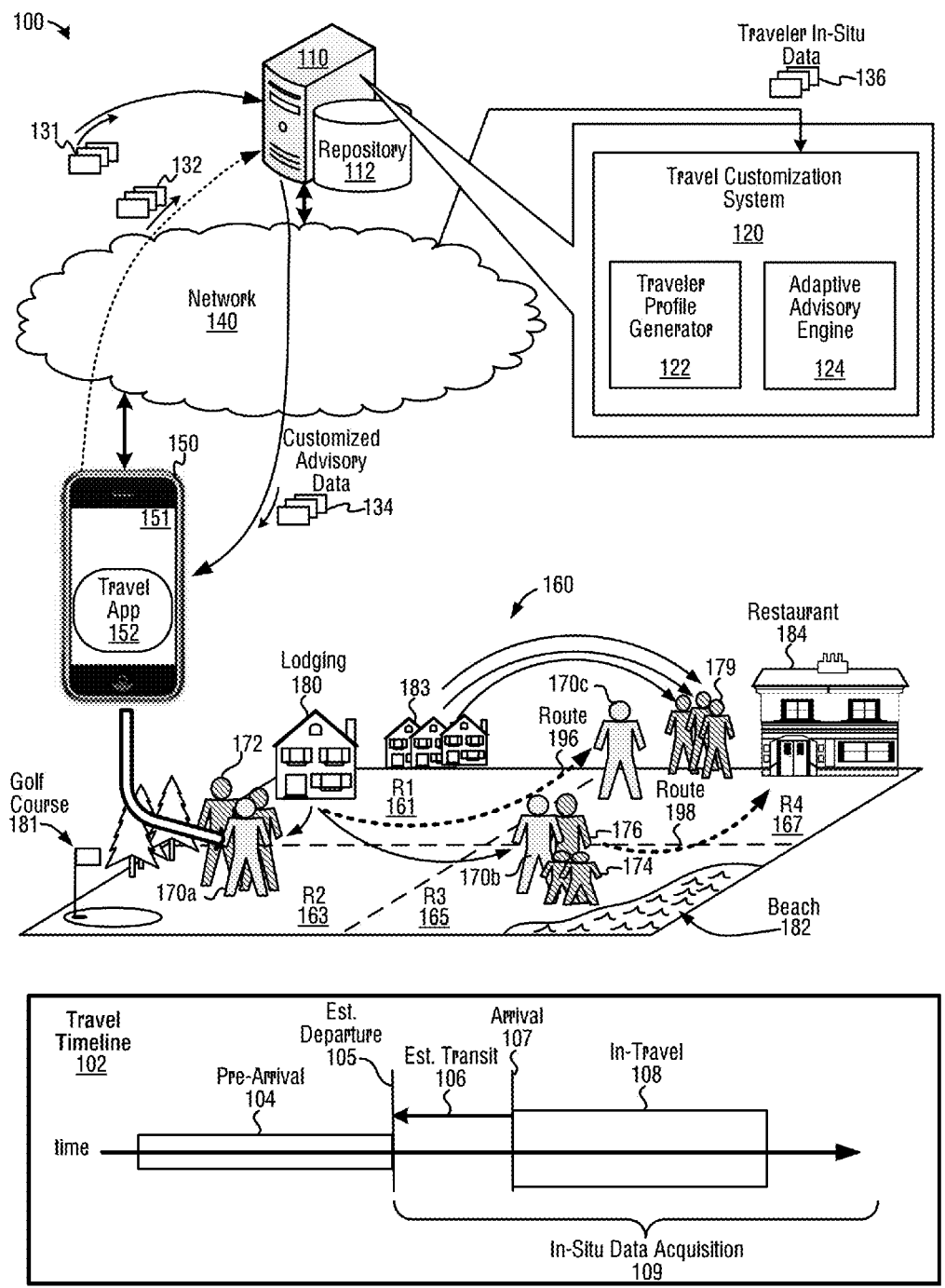
FIG. 1 is a diagram depicting a travel customization system, according to some embodiments.

FIG. 1 is a diagram depicting a travel customization system, according to some embodiments. Diagram 100 includes a travel customization system 120 configured to, among other things, to predict preferential activities in which a user may wish to engage. As such, travel customization system 120 can convey to a user real-time data (or near real-time data) that is customized to the traveler based on, for example, one or more attributes of the traveler. Further, travel customization system 120 may be further configured to navigate the user to (or cause the user to participate or engage in) one or more activities or destinations at geographical region 160, which may include lodging 180 at which the user is staying temporarily—whether for business or vacation. As shown, travel customization system 120 includes a traveler profile generator 122 and an adaptive advisory engine 124, either or both of which can be implemented in hardware, software, or a combination thereof. In this example, travel customization system 120 may be implemented as a computing device 110, which may include processors, logic, and other hardware, and a data repository 112, which may include executable instructions in firmware, software, or the like. Travel customization system 120 may also be configured to provide a secure, private network of computing devices that is accessible by its travelers' authorized computing devices as well as other privileged computing devices that may host or otherwise facilitate activities of interest.

Traveler profile generator 122 may be configured to generate or otherwise provide traveler profile data associated with a user, the traveler profile data including various data types specifying associated traveler attributes. Travel customization system 120 may use the traveler attributes to predict a preferred activity in which a user may wish to engage at geographic location 160. According to some examples, traveler profile generator 122 may receive externally-sourced data 131, which may include data retrieved from public or accessible databases (e.g., web-based or on-line databases) other than that of travel customization system 120. Traveler profile generator 122 may also receive via network 140 traveler in-situ data 136 from a mobile computing device 150, which may include executable instructions constituting an application ("travel app") 152. In some examples, traveler in-situ data 136 may include includes data that may be used to identify or derive travel attributes coterminous or substantially coterminous with present traveling or lodging experiences. In some examples, traveler in-situ data 136 may include locality-related data, such as a location (e.g., location identified by coordinates, such as GPS coordinates, longitude and latitude, etc.), a time of day/month/year, and other localized information (e.g., a predicted weather forecast). Further, traveler profile generator 122 may receive system travel data 132 that includes data representing travel attributes identified in, for example, past traveling or lodging experiences from mobile computing device 150 or other sources (e.g., past electronic rental arrangements facilitated by travel customization system 120).

Traveler profile generator 122 can generate data representing traveler attributes and associations between different types of traveler attributes. To illustrate, consider an example in which traveler attribute data is acquired in one or more past visits to geographic location 160. As shown, lodging 180 for a traveler (e.g., the user) is disposed in a first region ("R1") 161 of geographic location or region 160. In one example, traveler 170a may transit to a second region ("R2") 163 to join business colleagues 172 on a golf course 181. In this case, location data may be transmitted as traveler in-situ data 136, whereby traveler profile generator 122 may identify the location as associated with a golf course. Further, traveler profile generator 122 may identify mobile computing devices associated with colleagues 172 as companions linked to the activity of golf Thus, examples of traveler attribute data for traveler 170a may include "companion identities," "golf" as an activity type, a location identified as a "golf course," and data describing the interrelationship to form prediction pattern data. In some examples, prediction pattern data can be used to predict a traveler attribute or another activity. For instance, if traveler 170a has always been accompanied by colleagues 172 (e.g., with no other persons) in second region 163, then traveler 170a may be presumed to be playing golf (e.g., a predicted travel attribute of "golf" may be generated).

As another example, traveler 170b, who is associated lodging 180, may transit to a third region ("R3") 165 along with a spouse 176 and children 174 at the beach 182. In this case, location data may be transmitted as traveler in-situ data 136, whereby traveler profile generator 122 may identify a location associated with a lake. Further, traveler profile generator 122 may identify mobile computing devices associated with spouse 176 and/or children 174 as companions linked to the activity of "going to the beach," "beachcombing," etc. Thus, examples of traveler attribute data for traveler 170b may include "companion identities" of family members, "beach" as an activity type, and a location identified as a "lake."

In yet another example, traveler 170c, who is associated lodging 180, may transit to a fourth region ("R4") 167 to eat at a family-friendly restaurant 184. In this case, location data may be transmitted as traveler in-situ data 136, whereby traveler profile generator 122 may identify the location as associated with a type of restaurant, a type of cuisine, or the like. Thus, examples of traveler attribute data for traveler 170c may include data representing a preference for "family-friendly" restaurants and a location identified as a "restaurant." Note that travelers 170a, 170b, and 170c may represent the same traveler at different times or locations.

Adaptive advisory engine 124 can, among other things, may influence the direction of movement of a traveler within geographical region 160 to a destination at which the traveler may participate in a preferred activity. Further, adaptive advisory engine 124 may generate customized advisory data 134 for transmission via network 140 mobile computing device 150. In some cases, a representation of customized advisory data may be displayed on a user interface 151 of mobile computing device 150, or otherwise may be configured to influence the computations of an electronic map or route generator based on at least predicted activities derived from travel attributes (e.g., as implemented in a mapping application executed on mobile computing device 150).

To illustrate an example of adaptive advisory engine 124, consider that traveler attribute data (including past and/or present acquired data) is accessed during a visit to geographic location 160. As shown, a traveler (e.g., the user) is staying at lodging 180, which is disposed in first region 161 of geographic region 160. In one example, traveler 170a shares a cab from an airport to lodging 180 during which the identities of colleagues 172 are identified. In some cases, adaptive advisory engine 124 may predict that traveler 170a is on a business trip, and if so, adaptive advisory engine 124 may further predict that golf may be a preferred activity in which to participate with colleagues 172 (e.g., should the weather permit). As such, customized advisory data 134 can be transmitted to mobile computing device 150 to recommend or otherwise influence traveler 170a a round of golf.

As another example, consider that traveler 170b is driving from Austin to Galveston, Tex. During the car trip of about 3½ hours, traveler in-situ data 136 is transmitted to travel customization system 120 via network 140, whereby traveler in-situ data 136 includes one or more identities of spouse 176 and children 174. Further, traveler in-situ data 136 may also include location coordinates that coincide or are adjacent to Galveston Beach (e.g., "beach-going" identified as a traveler attribute). Therefore, adaptive advisory engine 124 may access traveler profile data indicating that when traveler 170b is accompanied on a trip to geographic location 160, which includes a beach 182. Then, adaptive advisory engine 124 may predict that "going to the beach" may be a desired activity for the family of traveler 170b. As such, customized advisory data 134 may include cause a representation (e.g., an icon, an electronic message, an electronic SMS text message, etc.) to be presented on user interface 151 providing localized information (e.g., a recommendation to visit the beach).

Adaptive advisory engine 124 may predict a next activity based on a relationship between location coordinates at which a mobile computing device resides (e.g., coordinates of beach 182 relative to coordinates of restaurant 184) and a travel attribute, such as a restaurant type or other meal type. Adaptive advisory engine 124 may generate customized advisory data 134 configured to cause presentation of a representation linked to customized advisory data 134 to influence a family to participate in a next activity. For example, consider that the local time is 5:00 pm at beach 182 for the family in the previous beach-trip example. Note that 5 pm is a typical time at which traveler 170c dines. Based on traveler attribute data (e.g., a "family friendly" type associated with the user), adaptive advisory engine 124 can determine restaurant 184 as preferred restaurant at which to take the family. As such, customized advisory data 134 may include data configured to change electronic navigation calculations or computations to determine a route 198 as a function of, for example, user-specific traveler attribute data. Thus, traveler 170b, spouse 176, and children 174 may receive real-time recommendations that are suitable for, or is otherwise tailored to, one or more members of the family.

Adaptive advisory engine 124 may further predict a next activity in which a traveler may engage based on data representing an aggregate activity in which multiple other travelers are participating (or desire to participate). As travel customization system 120 has insight into a subset of a population staying in geographic location 160, adaptive advisory engine 124 may generate a recommendation to a traveler to participate in a popular activity. For example, consider that a number of other travelers 179 staying at other lodging facilities 183 have visited, or are visiting, restaurant 184. Based on the aggregation of other travelers' behavior, customized advisory data 134 can include data configured to change navigation calculations to determine a route 196 as a function of, for example, aggregated traveler attribute data. Thus, traveler 170c (with or without spouse 176 and children 174) may be provided real-time recommendations that may be of interest to traveler 170c.

In some examples, a travel application 152 residing on mobile computing device 150 may be configured to perform in-situ data acquisition 109 in accordance with an example of a travel timeline 102. For example, traveler in-situ data 136 may be received to determine traveler attributes during in-travel durations 108 of time as described above. Further, in-situ data acquisition 109 may be performed during an estimated time of transit 106, which may be determined as a difference between an estimated departure time 105 (e.g., depending on a mode of transportation) and an arrival time 107. Note that travel application 152 is configured to receive accelerometer data, GPS (or other location) data, and motion data to determine, for example, a rate of speed. So if a traveler is expected to arrive in Galveston, Tex. at 7 pm, and location and movement data indicates a rate of travel of 65 mph, then the traveler is likely in a car. As such, in-situ data acquisition 109 may probe whether traveler (e.g., mobile computing device 150) is driving with others (e.g., other identifiable mobile computing devices) to determine whether the travel is for business or vacation, and other predictive information. By contrast, if the traveler is transiting by plane, travel application 152 is configured to detect a "plane mode" of operation and is further configured to initiate in-situ data acquisition 109 upon landing at 107. In some cases, travel application 152 may periodically data log location and time during pre-arrival 104 to gather data (e.g., preferred restaurant types and activities) prior to travel to predict preferential activities at geographic location 160.

In view of the foregoing, the structures and/or functionalities of travel customization system 120 can facilitate communication regarding preferred activities for a traveler so that the traveler's efforts and time during travel are minimally or negligibly impacted. In accordance with various embodiments, a preferential activity for a traveler can be predicted based on traveler attribute data, including, but not limited to, companion data, types of trips for certain destinations (e.g., business, vacation, extended family-visits, etc.), types of activities in which the traveler participates, meal types, lodging types, and relationship data that relate the above-described traveler attribute data. Note that according to various embodiments, travel customization system 120 can predict a next activity based on a first activity (or other prediction pattern data specifying a likelihood of performing one activity based on an occurrence of an earlier activity). Further, travel customization system 120 can predict a preferential activity based on aggregation of other traveler data (e.g., other travelers' attributes, locations, etc.), and can generate customized advisory data to navigate a traveler to a destination at which the preferential activity may be performed.

In some examples, if a traveler is known to play golf more than other activities at certain locations (e.g., nearby Palm Springs, Pebble Beach, etc.), and if the traveler is known fish at the other locations near water (rather than swimming, surfing, or scuba diving), travel customization system 120 can filter through activities for delivering content based on the traveler's preferences (e.g., travel attributes), as well as the time of day (and/or month or season) and a traveler's location as determined by, for example, travel application 152.

According to at least one example, traveler application 152 may be configured to identify data representing a subset of the travel-related attributes indicative of travel to a geographic region that includes a rented lodging, and responsive to the identification, travel application 152 may activate in-situ travel data acquisition. In another example, traveler customization system 120 may receive data representing a command (e.g., generated by opening a phone or accessing travel application 152) originating at a mobile computing device. The command may be configured to cause transmission of a subset of customized advisory data to the mobile computing device.

Figure 2:
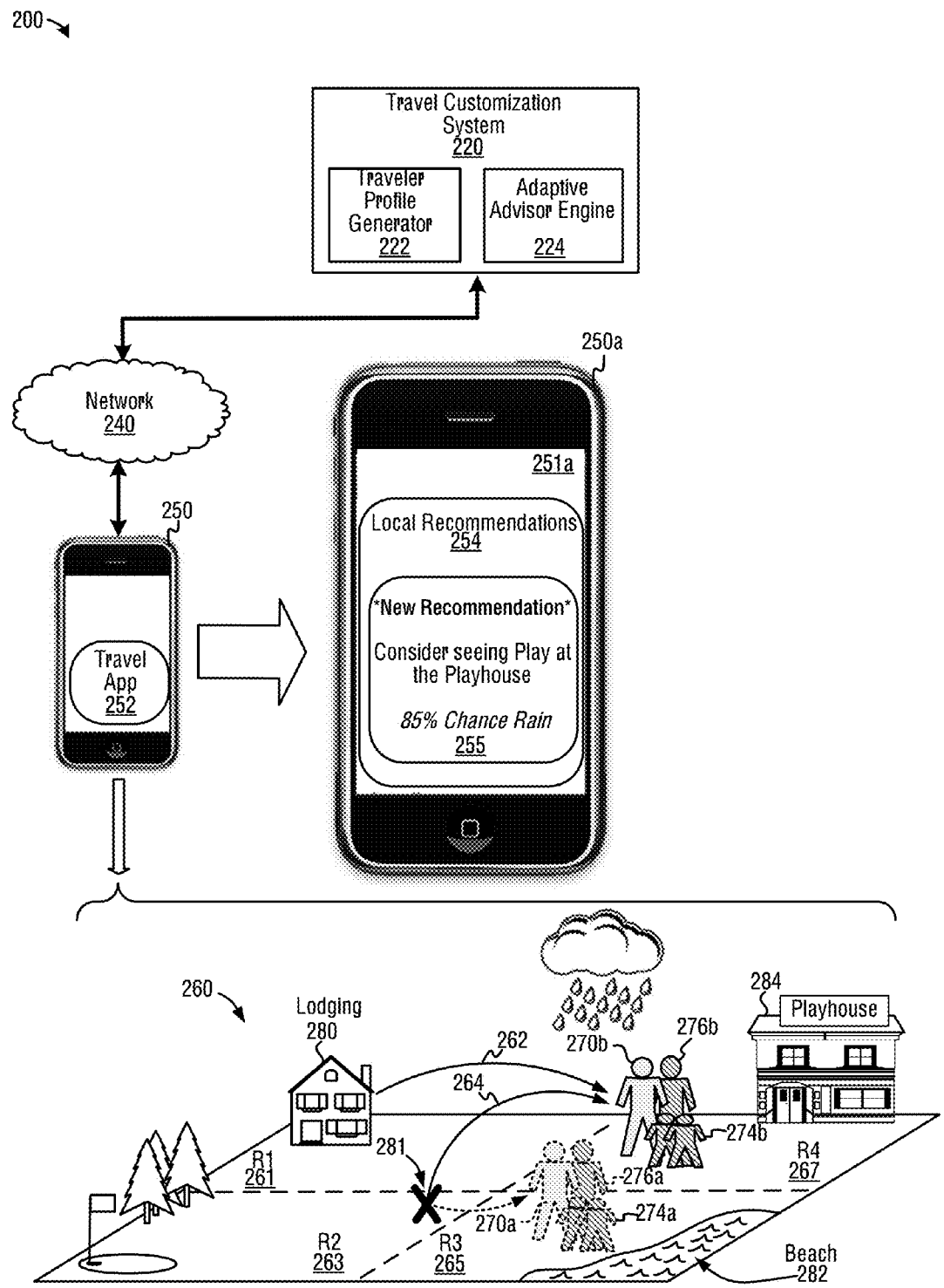
FIGS. 2 and 3 depict examples of a travel customization system, according to various embodiments.
Figure 3:
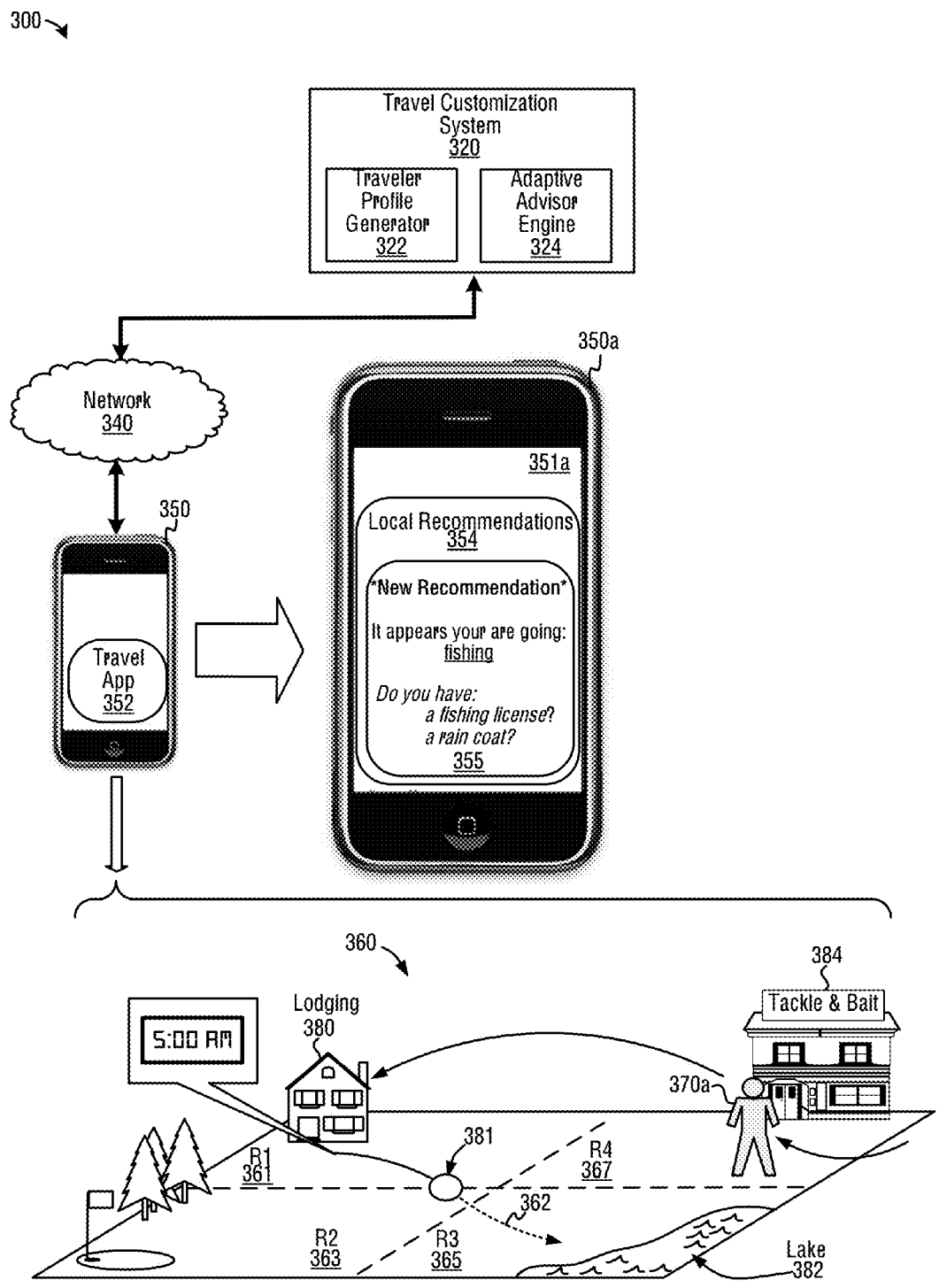

FIGS. 2 and 3 depict examples of a travel customization system, according to various embodiments. Diagram 200 includes a travel customization system 220, which, in turn, includes a traveler profile generator 222 and an adaptive advisor engine 224. Note that elements depicted in diagram 200 of FIG. 2 may include structures and/or functions as similarly-named or similarly-numbered elements of FIG. 1. As shown, travel customization system 220 is coupled via network 240 to a mobile computing device 250, which may include a travel application ("travel app") 252. In the context of travel to geographic region 260, travel customization system 220 and mobile computing device 250 exchange traveler in-situ data and customized advisory data. In the example shown, consider that a family including a traveler 270a, spouse 276a, and children 274a are staying at lodging 280 in region 261, and related travel attribute data includes "beach-going" as an activity. As such, adaptive advisor engine 224 may transmit customized advisory data to mobile computing device 250 to consider visiting a beach as a local recommendation.

Further consider that travel customization system 220 and/or travel application 252 detects a change in a value indicative of a locality-related characteristic to form a modified locality-related characteristic. In this example, consider that a value (e.g., a numeric value) representing "sunny day" or "swimming weather" is changed to a modified value representing "rainy day." In this case, a next activity (e.g., a "rainy day" activity) may be predicted as a function of the modified locality-related characteristic and data representing a traveler attribute. Further to this example, consider that the traveler attribute includes data representing "viewing a play" as a preferential activity (e.g., a traveler may have visited a play in past travels). As such, travel customization system 220 and/or travel application 252 may determine that "viewing a play" at playhouse 284 in region 267 may be preferred to visiting a water-logged beach 282. Thus, travel customization system 220 and/or travel application 252 may generate customized advisory data including routing data to navigate the family via route 262 to playhouse 284, at which traveler 270b, spouse 276b, and children 274b may view a play. Further, the customized advisory data may cause presentation of a representation 254 on interface 251a of mobile computing device 250a that provides advisory information 255 (i.e., a recommendation to view a play rather than going to beach 282 in region 265). Note that if customized advisory data is received at location 281 in region 263, the customized advisory data may include instructions to modify a direction of travel over route 264.

Diagram 300 includes a travel customization system 320, which, in turn, includes a traveler profile generator 322 and an adaptive advisor engine 324. Note that elements depicted in diagram 300 of FIG. 3 may include structures and/or functions as similarly-named or similarly-numbered elements of FIG. 1. As shown, travel customization system 320 is coupled via network 340 to a mobile computing device 350, which may include a travel application ("travel app") 352. In the context of travel to geographic region 360, travel customization system 320 and mobile computing device 350 exchange traveler in-situ data and customized advisory data.

In the example shown, consider that on the way to lodging 380 in region 361, a traveler 370a stops at a tackle and bait store 384 in region 367. Traveler in-situ data determined by travel application 352 can describe a detected travel attribute of "enter sporting goods store," as an example. Thus, stopping at tackle and bait store 384 may be viewed as performing a first activity. Next, consider that traveler 370a wakes up at 5:00 am the next morning. Travel application 352 is configured to receive accelerometer or motion data indicating traveler 370a is awake. As such, this information can be transmitted as traveler in-situ data determined by travel application 352. In the example shown, adaptive advisor engine 324 is configured to predict a next activity. In some cases, adaptive advisor engine 324 may be configured to detect a performance of a first activity (e.g., traveler 370a stops at a sporting goods store) and then wakes up at 5:00 am, then there is a relatively high likelihood (e.g., 80% chance or greater) that a user intends on going to lake 382 in region 365 to go fishing. Note that data constituting a predictive pattern in this example may include the activity of visiting tackle and bait store 384, or may include both the activity of visiting tackle and bait store 384 and an occurrence in which traveler 370a awakes before 6 am. Thus, adaptive advisor engine 324 may identify a prediction pattern (e.g., stopping at bait store and awaking at 5 am the next morning) that represents a likelihood of a next activity of occurring (e.g., going fishing).

In some examples, as traveler is heading past a golf course at location 381 in region 363, travel customization system 320 and/or travel application 352 may determine that "fishing" at lake 382 may be preferred to golfing. Thus, travel customization system 320 and/or travel application 352 may generate customized advisory data including routing data to navigate traveler 370a via route 362 to lake 382, at which traveler 370a may participate in fishing as a preferential activity. Further, the customized advisory data may cause presentation of a representation 354 on interface 351a of mobile computing device 350a that provides advisory information 355 (i.e., confirm whether traveler 370a is fishing and to remind traveler 370a of related information or activity sub-attributes). Note that if customized advisory data is received at location 381 in region 363, the customized advisory data may include instructions to modify a direction of travel over route 362 or otherwise confirm that the user is not traveling to a golf course.

Figure 4:
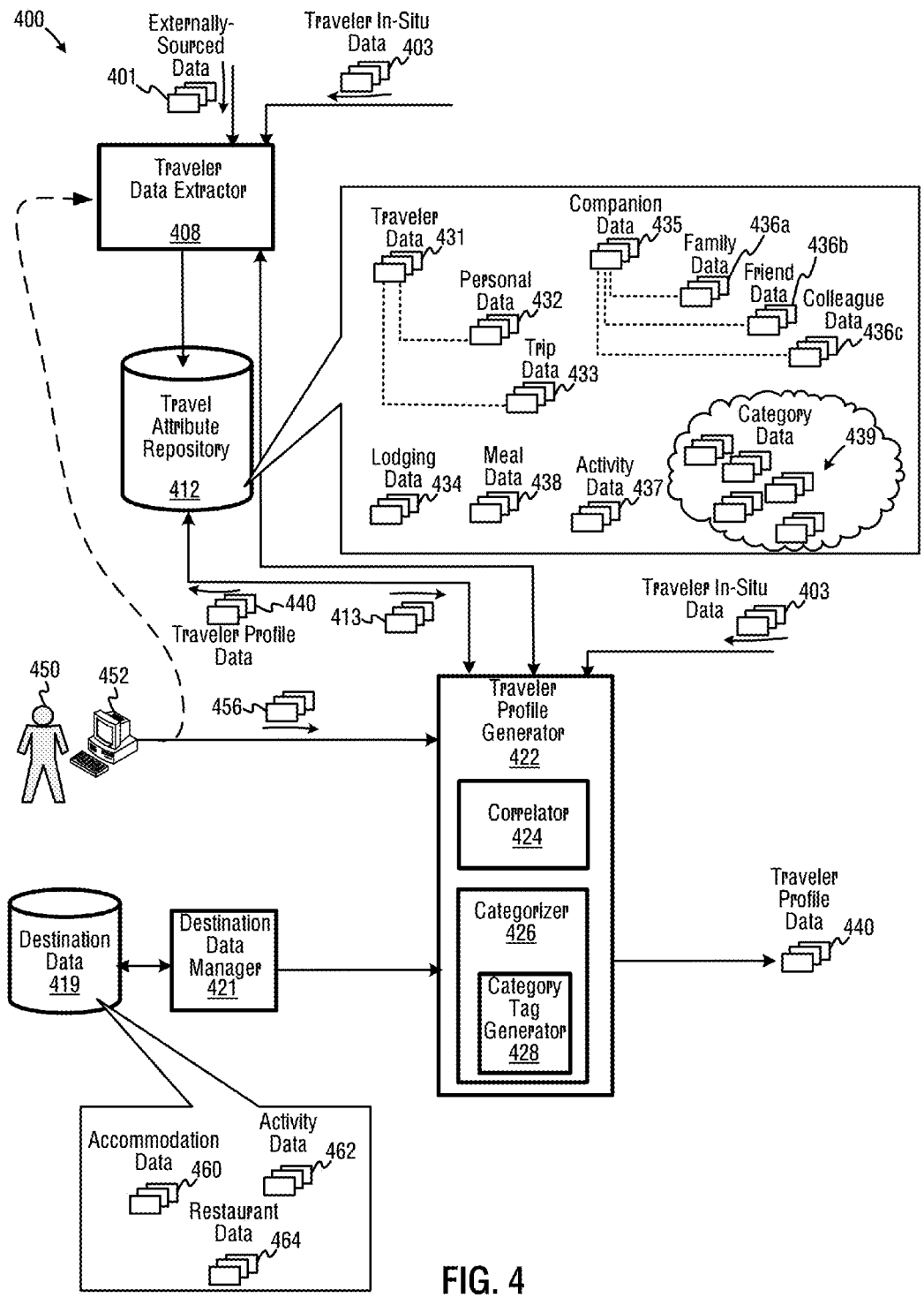
FIG. 4 is a diagram depicting an example of a traveler profile generator, according to some embodiments.

FIG. 4 is a diagram depicting an example of a traveler profile generator, according to some embodiments. Traveler profile generator 422 is configured to receive traveler-related data 413 (including other travel-related data) to generate, among other things, traveler profile data 440, which includes data specifying attributes of a traveler that can be used to predict preferential activities while traveling to a geographic region that includes rented lodging. Traveler profile generator 422 may include a correlator 424 that is configured to correlate various items of data, which, at least in some cases, may be a precursor to identifying an attribute associated with a traveler. Traveler profile generator 422 may also include a categorizer 426 that may be configured to categorize a user (or other travel-related aspects) based on the correlated items of data determined by correlator 424. In one example, categorizer 426 may include a category tag generator 428 that may be configured to tag or associate data representing a category to data representing a traveler or other travel attributes (e.g., related to the traveler). In some cases, tagged data may constitute at least a portion of traveler profile data 440. Further, traveler profile generator 422 is configured to store traveler profile data 440 in a travel attribute repository 412, which, at least in some examples, is a data storage device implementing any database management system, including, but not limited to MySQL, Microsoft SQL Server, Oracle, SAP, IBM DB2, SQL, ODBC, JDBC, and the like, or any other database modelling or arrangement software.

In various examples, travel attribute repository 412 may include traveler data 431, which includes personal data 432 describing a traveler and trip data 433 as travel attributes. Examples of personal data 432 may include demographic information, such as name, address, marital status, age, gender, presence of children, a dwelling type (e.g., a type and size of a residential house), a range of income, and the like. Examples of trip data 433 includes data indicating types of trips taken (e.g., business trip, vacation, etc.) and pointer or link data associating a trip to other travel attributes for specific destination (e.g., associating a vacation with a spouse, children, types of activities, meal types, types of lodging, etc., which may be used to predict a preferential activity).

Travel attribute repository 412 also may include companion data 435 which may include family data 436a, friend data 436b, and colleague data 436c, and other data types for other companions, such as clients, government officials, tour guides, etc., as travel attributes. Examples of family data 436a include data representing one or more members of the family, each member of the family represented by data indicating a familial relationship, and other travel-related attributes (e.g., whether a child or spouse accompanied a traveler on a trip, and if so, whether the family member also accompanied the traveler to specific activities). Friend data 436b and colleague data 436c include similar data. As an example, friend data 436b may include a subset of friends, all of whom are female, tend to accompany each other once a year to Las Vegas, to a winery, or to a spa. As such, friend data 436b for the group of friends may be associated with destinations that may predict a next trip as "a girls' (or guys') getaway weekend" trip and related activities. Similarly, colleague data 436c may include different subsets of colleagues, each subset being associated with visiting or traveling to a different client. As such, such travel-related attributes may be used to remind a traveler of certain activities preferred by a certain client, based on the subset of colleagues who are traveling with the traveler.

Travel attribute repository 412 may include lodging data 434, meal data 438, and activity data 437, any or all of which may constitute at least a portion of traveler attribute data. Examples of lodging data 434 include data representing characteristics of various lodging accommodations associated with a traveler, such as a type of lodging (e.g., a house, condo, a cabin, etc.), a number of bedrooms, a presence of the kitchenette, whether in walking distance of local attractions, whether pets are permitted, etc. Examples of meal data 438 include types of restaurants (e.g., family-friendly, fine dining, etc.), types of cuisine, hours of operation, relative distance or location to a lodging, etc. Examples of activity data 437 include data representing activities, such as surfing, snorkeling, golfing, boat or Jet Ski rental, fishing, working out, fitness training, running paths, horseback riding, cycling, etc., as well as data representing participation in events, such as weddings, carnivals, regattas, fishing tournaments, poker championships, holiday festivities, etc. Travel attribute repository 412 may also be used to store category data 439, which includes data describing category tags associated with a traveler to categorize a traveler relative to various activities and other travel-related aspects. According to some examples, travel attribute repository 412 may also include similar data for other travelers, as well as data representing an aggregation of travelers (e.g., stored in an anonymized manner).

Data and other information for forming traveler profile data 440 may be sourced from a variety of data sources. In some examples, data for forming or otherwise identifying travel attributes may be extracted from streams of data by a traveler data extractor 408. According to some examples, traveler data extractor 408 is configured to access various sources of data and parse through data streams (e.g., text or alpha-numeric strings) to atomize sources of data into items (e.g., into words) that can be used to determine attributes (e.g., travel-related attributes) associated with an activity, a location, a time frame, a traveler, an aggregated set of data for a group of travelers, and the like. According to some examples, correlator 424 may be configured to correlate items associated with atomized data and/or tags to linked atomized data with an item tag (or association data). In some examples, traveler data extractor 408 can be configured to extract symbolic data (e.g., atomize or other units of data or information) that describe, for instance, an activity or location of an activity. Correlator 424 may be configured to correlate one or more subsets of the symbolic data (e.g., data representing strings of test, location coordinates, timestamps, etc.) to data representing an item tag.

In one example, traveler attribute data can be extracted from externally-sourced data 401, which may originate from any publicly-available database (e.g., any web-based source, including governmental databases, etc.) or restricted-access databases (e.g., data from a credit score rating facility that typically maintains data on household income, marital status, education levels, dwelling/residence type, value of home, number of adults, length of residence, size of family, number of dependents, etc.). In another example, traveler attribute data can be extracted from traveler in-situ data 403, which may include location coordinates, timestamp data (e.g., associated with groups of location coordinates), and other locality-related data (e.g., a temperature or weather conditions during which a traveler participated in a specific activity). Further, traveler in-situ data 403 may include data representing user interactions on a mobile computing device (not shown), such as the results of a web search (e.g., searching for golf courses), a summary of telephone numbers called that are associated with a geographic region (e.g., a restaurant that was called), and other user interaction-related data. Traveler data extractor 408 may be configured to extract item data from these types of traveler in-situ data 403 as well.

Traveler attribute data can be extracted from data 456, which may represent data input by a user 450 via a computing device 452 to secure a rental property for a specific time frame and purpose. Moreover, traveler attribute data can be extracted from destination data stored in a repository 419 coupled to a destination manager 421, which may be implemented in a computing device, to maintain and provide access to data associated with one or more rental properties available for lodging in a private, secured network of a travel customization system (not shown). For example, destination data may include accommodation data 460, which may include lodging characteristics and information about available rental properties, restaurant data 464, which may include types of restaurants and cuisine as provided by a rental property owner, and activity data 462, which may include types of activities as provided by one or more rental property owners. While diagram 400 describes a number of sources for obtaining traveler attributes, traveler profile generator 422 may receive data from any number of sources and is not limited to those shown or discussed relative to FIG. 4.

Figure 5:
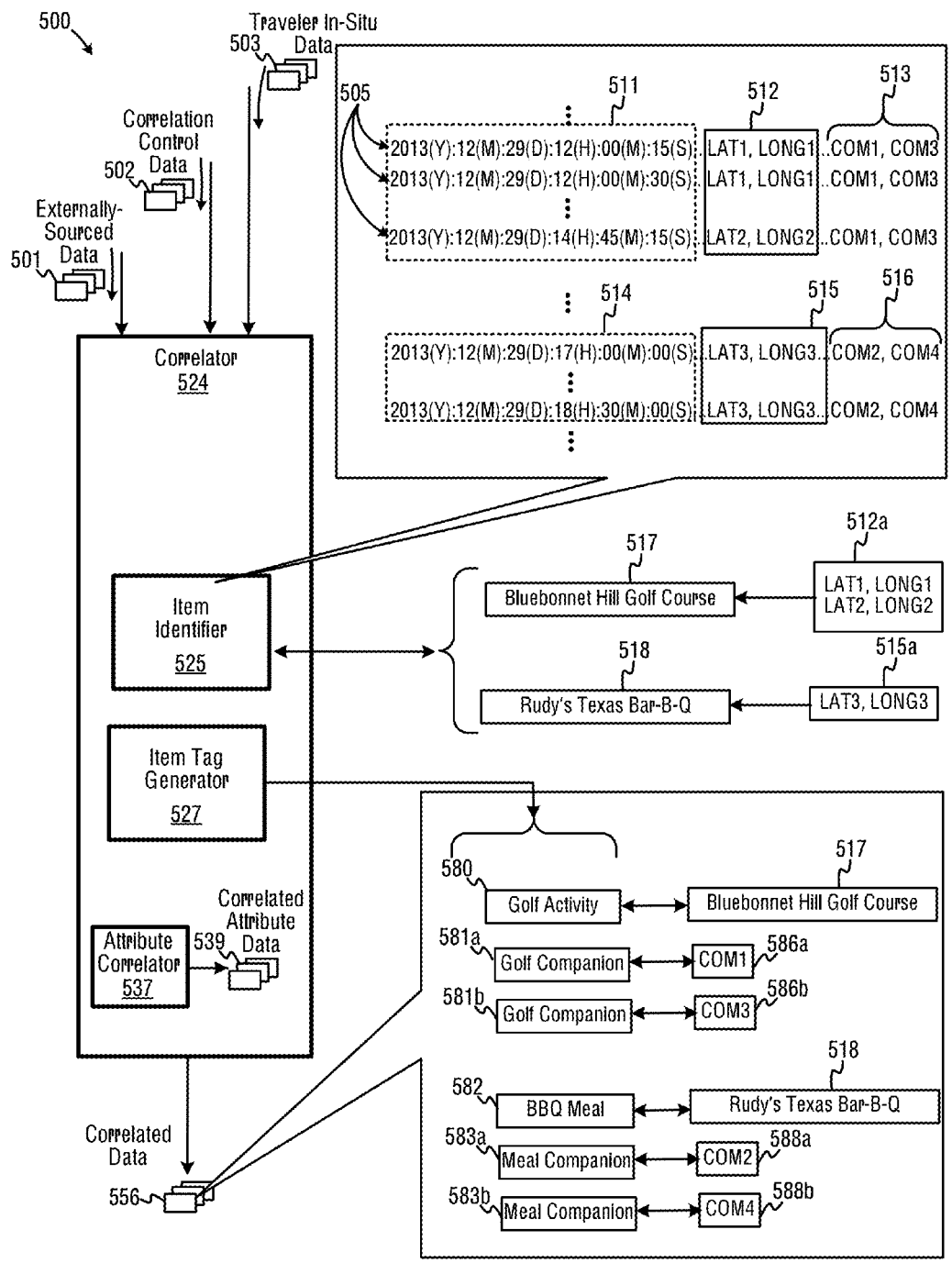
FIG. 5 is a diagram depicting an example of a correlator, according to some examples.

FIG. 5 is a diagram depicting an example of a correlator, according to some examples. Diagram 500 includes a correlator 524 configured to receive, for example, externally-sourced data 501, correlation control data 502, and traveler in-situ data 503, and is further configured to generate correlated data 556, which identifies one or more travel-related aspects that may be correlated to form travel attribute data. Further to diagram 500, correlator 524 may include an item identifier 525 to identify portions of data (e.g., portions of extracted data), an item tag generator 527 to tag (or associate) the portions of data with a representation indicative of an item, and an attribute correlator 537 to relate or otherwise generate data expressing relationship or links between or among traveler attributes.

To illustrate operation of correlator 524 and its constituent components, consider the following example. Traveler in-situ data 503 may include streams of data 505 that include, for example, instances of time 511 and 515 (e.g., timestamps indicating one or more of a year ("Y"), a month ("M"), a day ("D"), an hour ("H"), a minute ("M"), and a second ("S")), instances of location 512 and 515 (e.g., GPS and/or longitudinal and latitudinal coordinates), and instance of companionship 513 and 516 (e.g., data representing identities of companions present during instances of time 511 and 515, respectively). Correlation control data 502 include data parameters used to define an activity (or other travel attributes) based on at least time and/or location data. For example, a traveler may visit a group of location coordinates associated with a golf course, but depending on an amount of time spent there, the traveler may be not be golfing but rather using a driving range, purchasing golf accessories, or having lunch with a friend. As such, correlation control data 502 specifies the types of activities associated with a location as a function of, for example, an amount of time or other travel-related data (e.g., companionship travel attributes, etc.).

Item identifier 525 may receive externally-sourced data 501 that describes a group of location coordinates that substantially coincide with instances of location 512, and further identifies a golf course named "Bluebonnet Hill Golf Course" on Decker Lane in Austin, Tex. As shown, instances of time 511 indicate that a traveler is at the golf course from 12:00 pm to 2:45 pm, and, as such, item identifier 525 associates golf course identifier 517 to a group of location coordinates 512a. Further, item identifier 525 may receive other externally-sourced data 501 that describes another group of location coordinates that substantially coincides with instances of location 514, which identify a restaurant named "Rudy's Texas Bar-B-Q" in Round Rock, Tex. As shown, instances of time 514 indicate that the traveler is at a restaurant from 5:00 pm to 6:35 pm, and, as such, item identifier 525 associates restaurant identifier 518 to a group of location coordinates 515a.

Correlation control data 502 may define instances of location 512 to be coterminous with a golf course for at least 2 hours to attribute an activity associated with the location coordinates to a "round of golf." As traveler spent 2½ hours at a golf course, then item tag generator 527 may be configured to tag golf course identifier 517 with a golf activity item tag 580, thereby indicating that location coordinates 512a can coincide with a golfing activity for predicting an preferential activity presently or subsequently. Further, correlation control data 502 may define instances of location 514 to be coterminous with a restaurant for at least 1 hour to attribute an activity associated with the location coordinates to a "having dinner." As traveler spent 1½ hours at a restaurant, then item tag generator 527 may be configured to tag restaurant identifier 518 with a meal type item tag 582, thereby indicating that location coordinates 515a can coincide with a meal for predicting an preferential restaurant presently or subsequently.

Attribute correlator 537 is configured to correlate other attribute data to form correlated attribute data 539. For example, consider that two colleagues golfed with the traveler, whereby the identities of the colleagues are indicated as data representing companion ("COM1") 586a and companion ("COM3") 586b. Attribute correlator 537 may be configured to correlate or associate companion data 586a and 586b to data representing tag ("golf companion") 518a and tag ("golf companion") 581b, respectively. By identifying the colleagues as golf companions, a future activity may be predicted if those same colleagues are again identified in a later business trip. Similarly, attribute correlator 537 may be configured to correlate or associate the identities of family members with whom the traveler is dining. In this example, attribute correlator 537 may be configured to correlate or associate companion data 588a (e.g., a spouse identified as COM2) and companion data 588b (e.g., a child identified as COM4) to data representing tag ("meal companion") 583a and tag ("meal companion") 583b, respectively.

Note that attribute correlator 537 may also be configured to predict a travel attribute or a portion thereof. For example, next time the traveler is engage in a first activity (e.g., visiting a beach) along with a spouse and child adjacent to a BBQ restaurant, a travel customization system may predict a preference for the BBQ restaurant. Note further that correlator 524 may be configured to generate correlated data 556 that includes any type of correlations or associations between attributes and/or item data for travel attributes, and that correlator 524 is not limited to the examples described above.

Figure 6:
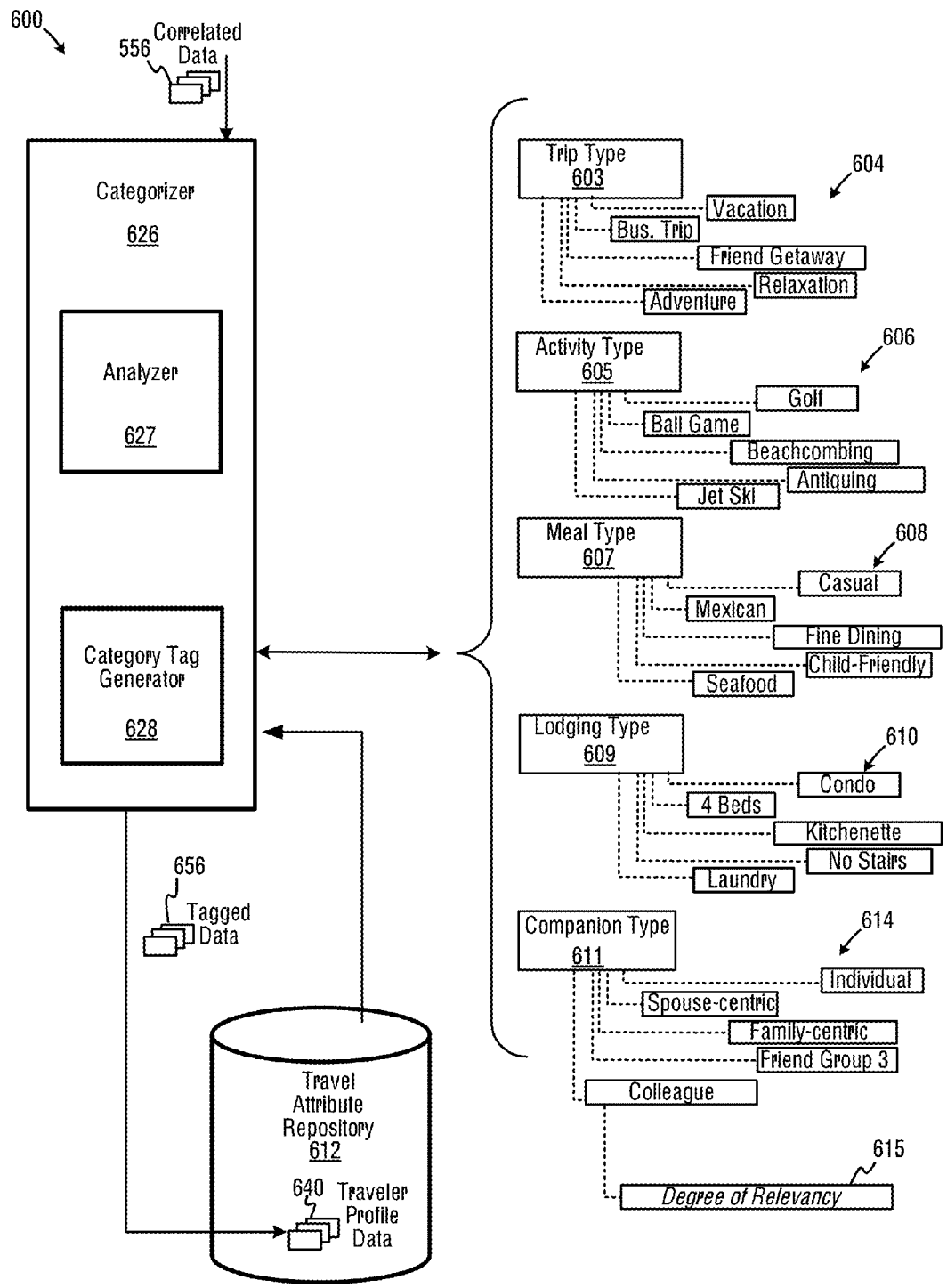
FIG. 6 is a diagram depicting a categorizer in accordance with some embodiments.

FIG. 6 is a diagram depicting a categorizer in accordance with some embodiments. Diagram 600 includes a categorizer 626 that is configured to receive correlated data 556 from a correlator, and may be further configured to generate tag data 656 that specifies one or more categories to which a traveler and/or traveling companions relate. Categorizer 626 is shown to include an analyzer 627 that may analyze one or more item tags associated with activity and/or location included in correlated data 556, and a category tag generator 628 that may be configured to categorize an activity or a location to form a category tag, whereby tagged data 656 includes an association of a category tag to a user (or traveler). Tag data 656 can be stored in a travel attribute repository 612 as traveler profile data 640.

Further to diagram 600, category tag generator 628 may be configured to identify a category type to which category tag belongs. Examples of category types include a trip category type 603 that describes the type of travel (e.g., whether travel is for vacation, a business trip, relaxation, adventure, a friend getaway, etc.), and an activity category type 605 that describes a type of activity in which the traveler likely participate (e.g., golf, attending a ballgame, beachcombing, antiquing, jet skiing, etc.). Examples of other category types include a meal category types 607 that describes the type of meal a traveler likely may consume (e.g., a meal relating to casual dining, Mexican cuisine, fine dining, a meal at a child-friendly restaurant type, seafood, etc.), and include lodging category type 609 that specify lodging characteristics preferred by a traveler for purposes of, for example, presenting customized listings of rental properties for future travel (e.g., whether lodging is associated with a condo, a size of four bedrooms, presence of a kitchenette, stairs are absent (for elderly or disabled travelers), presence of a laundry, etc.). Examples for another category type include a companion category type 611 that describes a type of companion that may accompany a traveler on a trip (e.g., a trip taken as an individual, a spouse-centric trip or a "couple getaway," a family-centric trip, a trip with a group of friends identified as "friend group 3," a trip with one or more colleagues, etc.).

Note that one or more category tags may be associated with data representing value 615 indicative of a degree of relevancy. For example, analyzer 627 can determine the frequency in which a certain travel type 603 occurs, or a certain activity type 605 occurs, or a certain companion type 611 occurs. Based on the frequency (or any other parameter), category tag generator 628 may also assign a degree of relevancy 615 to prioritize a selection and/or presentation of one or more subsets of customized advisory data should, for example, multiple activities may be preferential. For example, a traveler may include travel attribute data that specifies both a golfing activity and a fishing activity. To optimize the most appropriate information presented to the traveler, a degree of relevancy associated with golfing may be of greater value than that associated with fishing. Therefore, an adaptive advisory engine may predict a traveler may be more inclined to golf than fish as preferential activity and thus can generate customized advisory data directing a traveler to a golf course.

Figure 7:
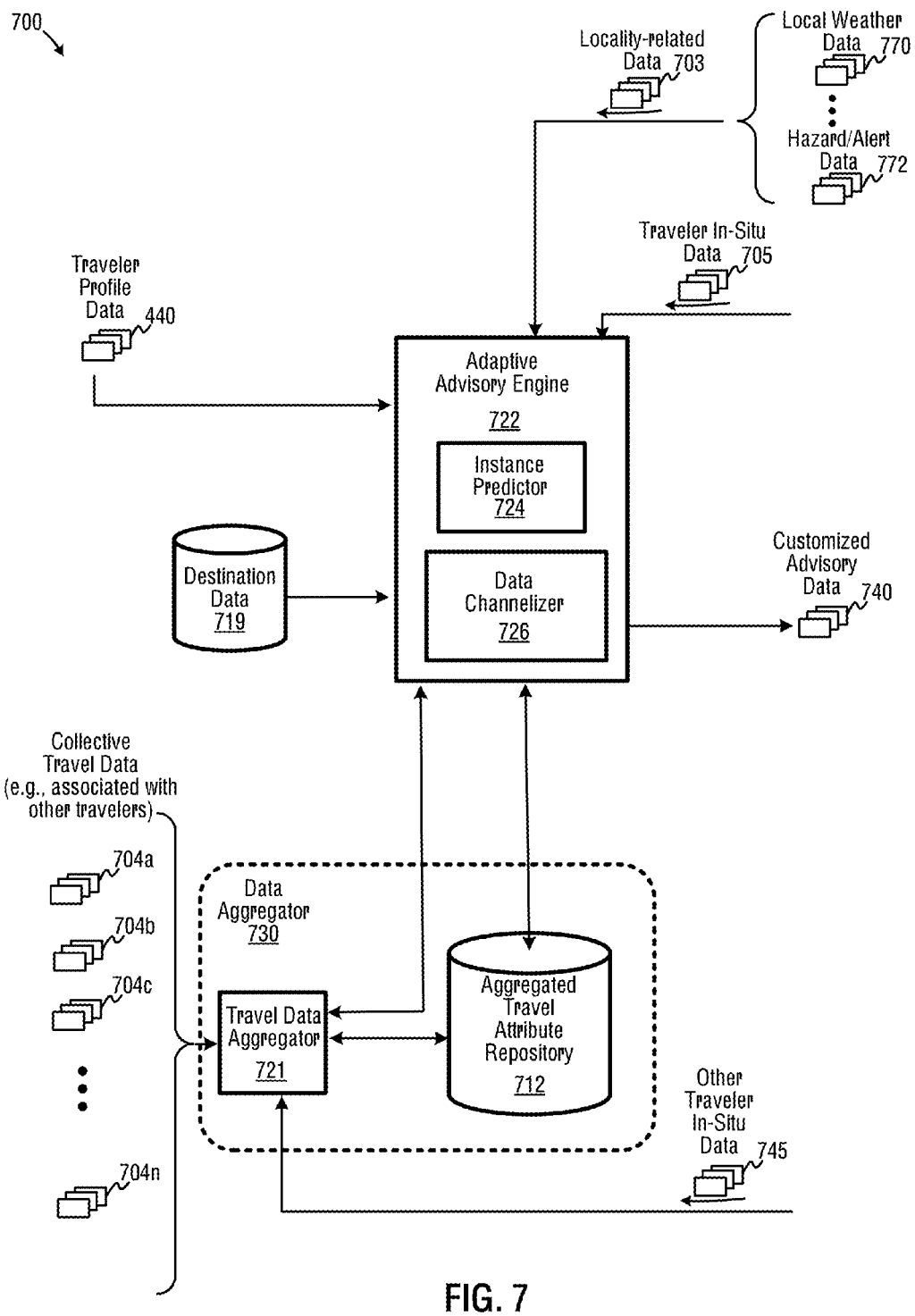
FIG. 7 is a diagram of an example for an adaptive advisory engine, according to some embodiments.

FIG. 7 is a diagram of an example for an adaptive advisory engine, according to some embodiments. Diagram 700 includes an adaptive advisory engine 722, which, in turn, includes an instance predictor 724 configured to predict one or more likely activities, meals, sets of companions, etc., and a data channelized or 726 configured to determine a preferential activity to which a traveler may be channelized via, for example, one or more subsets of customized advisory data 740. Note that elements depicted in diagram 700 may include structures and/or functions as similarly-named or similarly-numbered elements of other figures described herein.

Adaptive advisory engine 722 may be configured to access traveler profile data 440 that may originate from a memory (not shown) storing data representing travel attributes associated with a user. Adaptive advisory engine 722 also may be configured to identify data representing a portion of traveler attributes that are associated with a geographic region (e.g., an approximate location that includes lodging for a traveler). In some examples, the portion of traveler attributes describes data representing a subset of activities or restaurants that a traveler may prefer when traveling to particular region. The portion of traveler attributes may be included in traveler profile data 440 and/or in traveler in-situ data 705 received from a mobile computing device collocated with a user and the geographic region.

Adaptive advisory engine 722 may also receive locality-related data 703 indicative of locality-related characteristics for the geographic region. In this example, locality-related data 703 may include data representing local weather forecast data 770 for the geographic region, hazard/alert data 772 indicating hazards occurring in the geographic region (e.g., "Boil Water" advisory, or a "no swimming" advisory at the beach due to sewage spill, etc.). Adaptive advisory engine 722 may receive traveler in-situ data 705, which may include location coordinates and/or time stamps as logged or determined by, for example, a traveler application disposed on a mobile computing device. Note that in some examples, traveler in-situ data 705 may include locality-related data 703 (or vice versa).

Instance predictor 724 of adaptive advisory engine 722 may be configured to predict an activity as a function of a locality-related characteristic and data representing a travel attribute. In one example, a locality-related characteristic may be predicted rainfall at the geographic region, and the travel attribute may be indicative of beach-going as an activity. In another example, locality-related characteristics may be a location and the travel attribute may be indicative of golfing is an activity. Data channelizer 726 may be configured to customized advisory data 740 that may be configured to cause presentation of a representation linked to (e.g., associated with) the customized advisory data to engage in the first activity. Further, customized advisory data 740 may include data and/or executable instructions to cause modification in direction of travel or navigation to a predicted preferential activity. In some examples, adaptive advisory engine 722 can channelize a traveler "away" from a preferred activity of swimming should a "no swimming" advisory be in effect.

According to some examples, adaptive advisory region 722 may receive data from a data aggregator 730 for predicting preferential activity to which a traveler may be directed. Data aggregator 730 includes a travel data aggregator 721 that is configured to aggregate data, including travel attributes, of other travelers (e.g., aggregated data based on other travelers' profile data 704a, 704b, 704c, . . . 704n). In some cases, travel data aggregator 721 may be configured to receive other traveler in-situ data 745 originating from, for example, a geographic region including the traveler. Further, travel data aggregator 721 may be configured to form aggregated traveler data for storage in an aggregated travel attribute repository 712. Note that travel data aggregator 721 may suppress or otherwise remove identities of other travelers so as to form "anonymized" aggregate traveler data.

In one example, travel data aggregator 721 may receive data indicative of other traveler data that indicates participation of other travelers in an activity in a geographic region, and further may form aggregated traveler data. Data channelizer 726 may generate a subset of customized advisory data 740 based on the aggregated traveler data. For example, consider that aggregated traveler indicates that a number of other travelers are participating in a fishing competition. As such, content (e.g., notifications of charter boat rentals, etc.) may be channelized or otherwise delivered electronically to the traveler as customized advisory data. But, in some cases, if too many people are participating in the fishing competition, data channelizer 726 may advise or otherwise predict a round of golf as an alternate activity to avoid the crowds that are fishing.

Note that data channelizer 726 can generate customized advisory data 740 based on destination 719 to channelize a potential traveler to a subset of rental listings that are associated with lodging characteristics or other travel attributes that may be preferable to a traveler.

Figure 8:
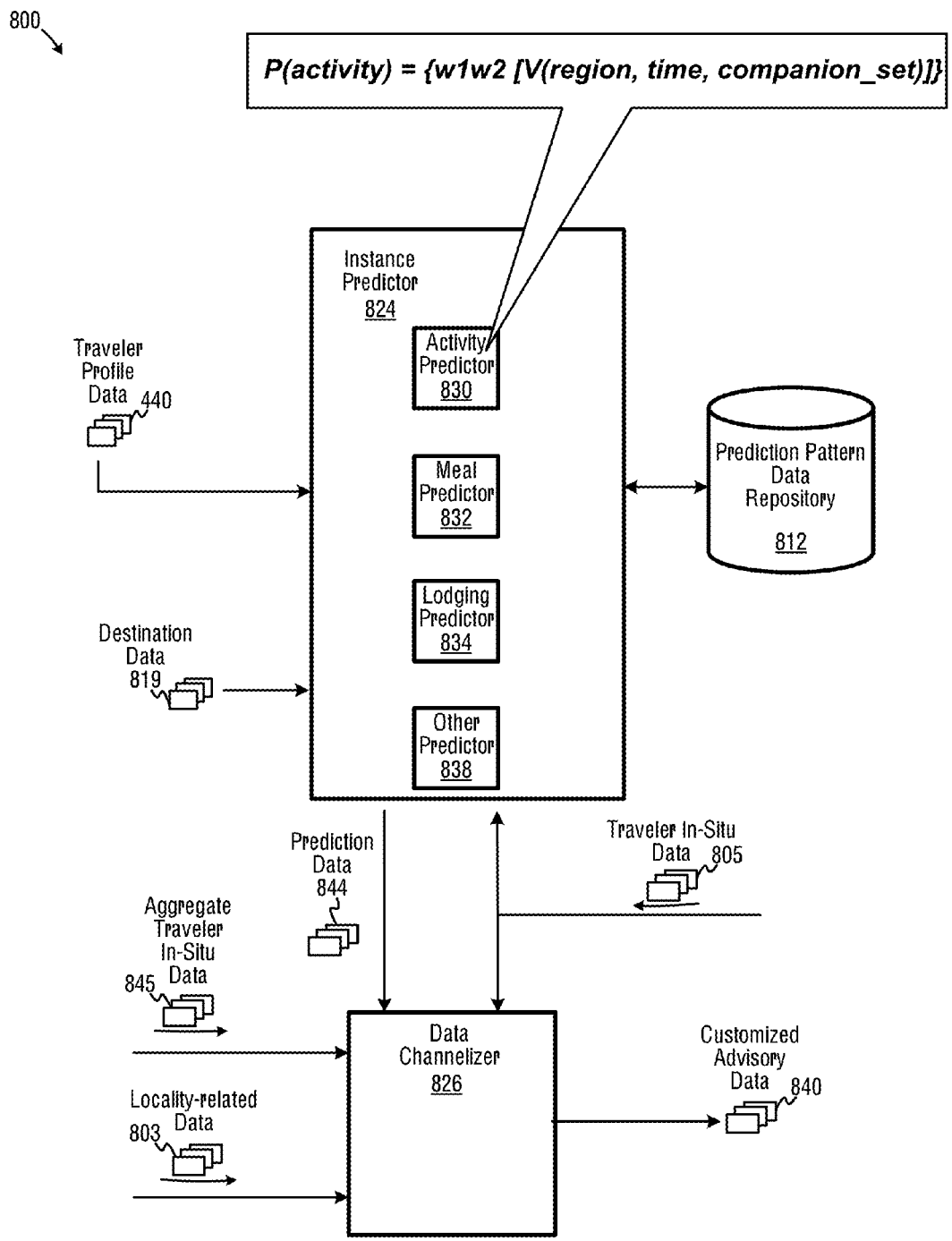
FIG. 8 is a diagram depicting an instance predictor and a data channelizer, according to some embodiments.

FIG. 8 is a diagram depicting an instance predictor and a data channelizer, according to some embodiments. Diagram 800 includes an instance predictor 824 and that data channelizer 826. Instance predictor 824 is configured to receive traveler profile data 440, destination data 819, traveler in-situ data 805, and data representing a prediction pattern stored in data arrangements in a prediction pattern data repository 812. Further, insist predictor 824 is configured to generate prediction data 844 including, for example, data representing one or more activities predicted as preferential activities for at least one certain traveler. Data channelizer 826 is configured to receive prediction data 844, aggregate traveler in-situ data 845, traveler in-situ data 805, and locality-related data 803 for selecting at least one preferential activity to which a traveler may be channelized, according to customized advisory data 840. Note that elements depicted in diagram 800 may include structures and/or functions as similarly-named or similarly-numbered elements of other figures described herein.

According to some examples, instance predictor 824 may include one or more logic modules implemented as activity predictor 830, meal predictor 832, lodging predictor 834, or other predictor 838, including a collaborative predictor configured to predict one or more companions with which to participate in an activity. In the example shown, activity predictor 830 can be configured to determine a probability, "P(activity)," may occur based on at least of value, "V," as a function of, for example, a region, a time frame, and set of companions. In some examples, the value, V, may be derived from prediction patterns indicating greater probabilities based on greater number of sequenced occurrences of activities that constitute a likely activity. For example, the probability of snow skiing may be relatively high in a region including Aspen, Colo., during the winter season, and with a set of companions that ski frequently, whereas the probability of snow skiing may be relatively low in the same region during the month of August (i.e., the summer season). Optionally, the probability of an activity may be determined by one or more weighting factors, such as a weighting factor one ("w1") and a weighting factor two ("w2"). In some cases, weighting factor one can represent a value indicative of a degree of relevancy. Further to the previous snow skiing example, if a person or companions have no record of skiing, then they may be up to view a film festival in Aspen rather than snow skiing. Thus, in their case, the probability of snow skiing may be driven to a relatively low probability by a low weighting value due to an absent record of skiing.

In another example, other predictor 838 may be configured to generate customized advisory data 840 based on a relationship between a group of location coordinates and a travel attribute. For example, other predictor 838 may be configured to determine a relationship between the location coordinates at which an activity may occur (e.g., via GPS coordinates) and a travel attribute (e.g., an activity tag specifying "beach-going" linked or associated to the location coincident with the location coordinates). Further, other predictor 838 may identify a next activity based on the relationship between the location coordinates of a present activity and the travel attribute. Data channelizer 826 then can generate a next subset of customized advisory data 840 that may be configured to cause presentation of a representation linked to other customized advisory data to engage a user in a next activity.

In yet another example, other predictor 838 may be configured to receive data indicative of a presence of a subset of other mobile computing devices as a subset of locality-related characteristics (e.g., other identifiers associated with the other mobile computing devices, such as MAC IDs). Other predictor 838 then may match data representing a tag for travel attribute against another tag for a subset of companion identities associated with the other mobile computing devices. As such, other predictor 838 may predict an activity based on data representing a subset of companion identities.

Figure 9:
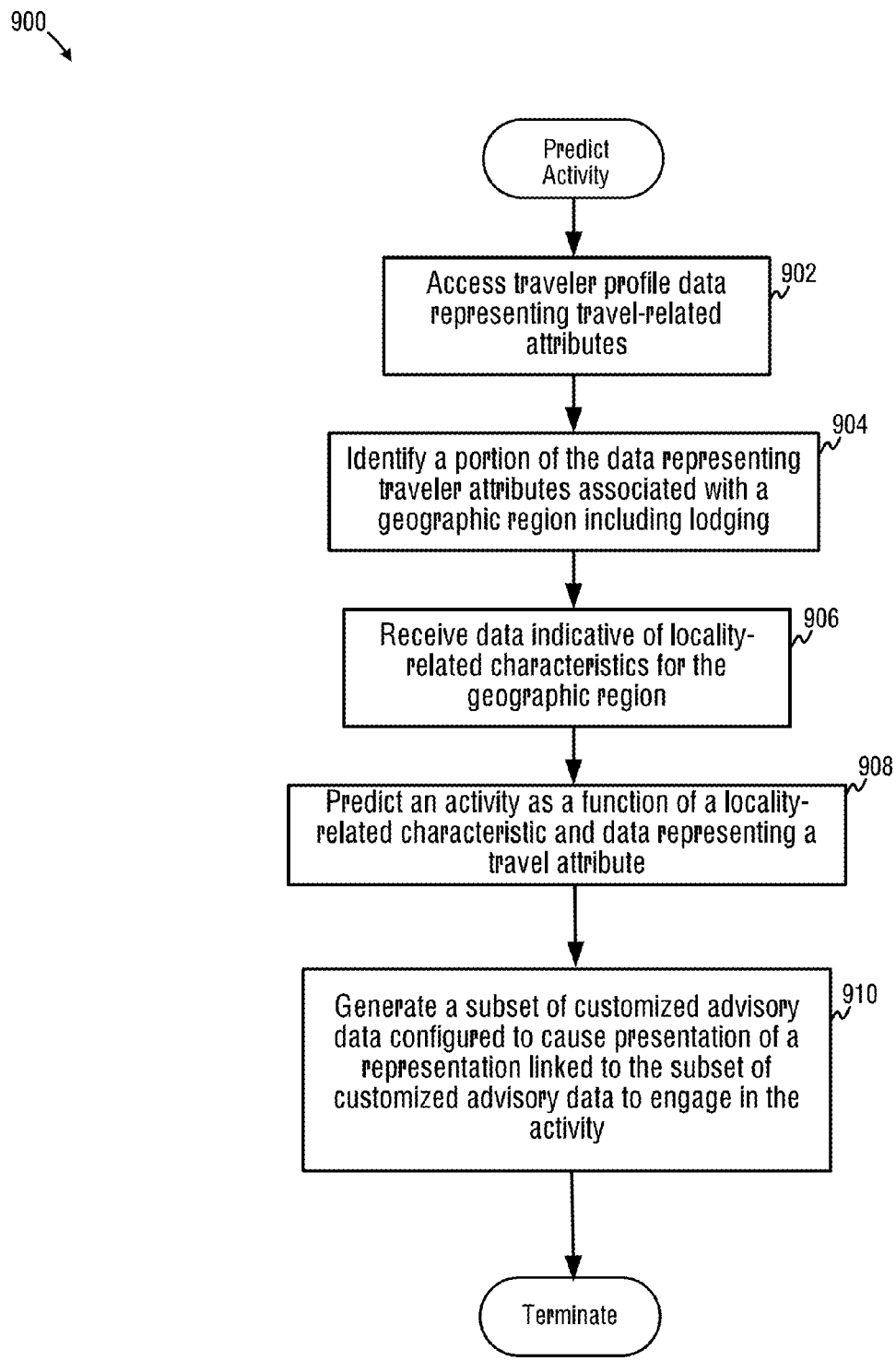
FIG. 9 is an example of a flow diagram to predict an activity, according to some embodiments.

FIG. 9 is an example of a flow diagram to predict an activity, according to some embodiments. At 902, flow 900 causes access of traveler profile data representing travel-related attribute, and a portion of the data representing traveler attributes associated with a geographic region is identified at 904. The geographic region may include lodging at which a traveler is staying. At 906, data indicative of locality-related characteristics for the geographic region is received, and at 908 an activity may be predicted as a function of a locality-related characteristic and data representing a travel attribute. Next, a subset of customized advisory data may be generated at 910, whereby the customized advisory data may be configured to cause presentation of a representation linked to the customized advisory data to engage in the activity.

Figure 10:
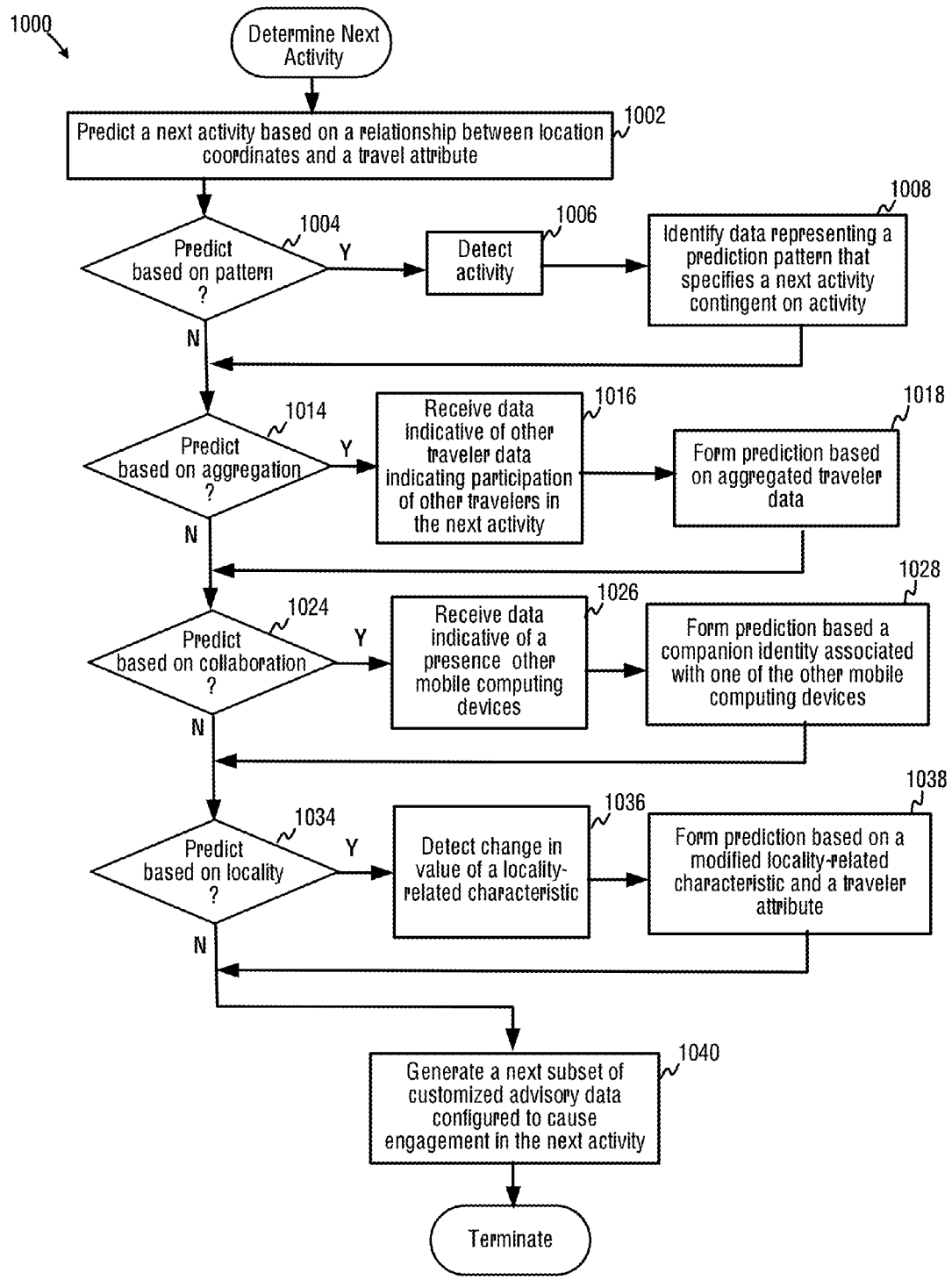
FIG. 10 is an example of a flow diagram to determine a next activity, according to some embodiments.

FIG. 10 is an example of a flow diagram to determine a next activity, according to some embodiments. At 1002, the next activity is predicted based on a relationship between location coordinates and a travel attribute. Further, the next activity may be predicted based on one or more of data representing a predictive pattern at 1004, data representing aggregated traveler data at 1014, data representing collaboration at 1024, and/or data representing locality-related characteristics at 1034. If determined in the affirmative at 1004, then flow 1000 detects an activity at 1006 and identifies data representing a prediction pattern at 1008 that specifies a next activity, which may be contingent on the performance of a precedent activity. If determined in the affirmative at 1014, then flow 1000 receives data indicative of other traveler data specifying participation of other travelers in the next activity at 1016, and forms a prediction at 1018 based on aggregated traveler data. If determined in the affirmative at 1024, then flow 1000 receives data indicative of a presence of other mobile computing devices at 1026, and forms a prediction at 1028 based on companion identities associated with one or more of the other mobile computing devices. If determined in the affirmative at 1034, then flow 1000 contacts a change in the value of a locality-related characteristic at 1036, and forms a prediction at 1038 based on a modified locality-related characteristic and/or a traveler attribute. At 1040, a next subset of customized advisory data is generated, the customized advisory data configured to cause engagement in the next activity. For example, the customized advisory data may include data and/or executable instructions to cause modification in navigation or changes in computation of a mapping application, based on one or more of the functionalities described herein.

Figure 11:
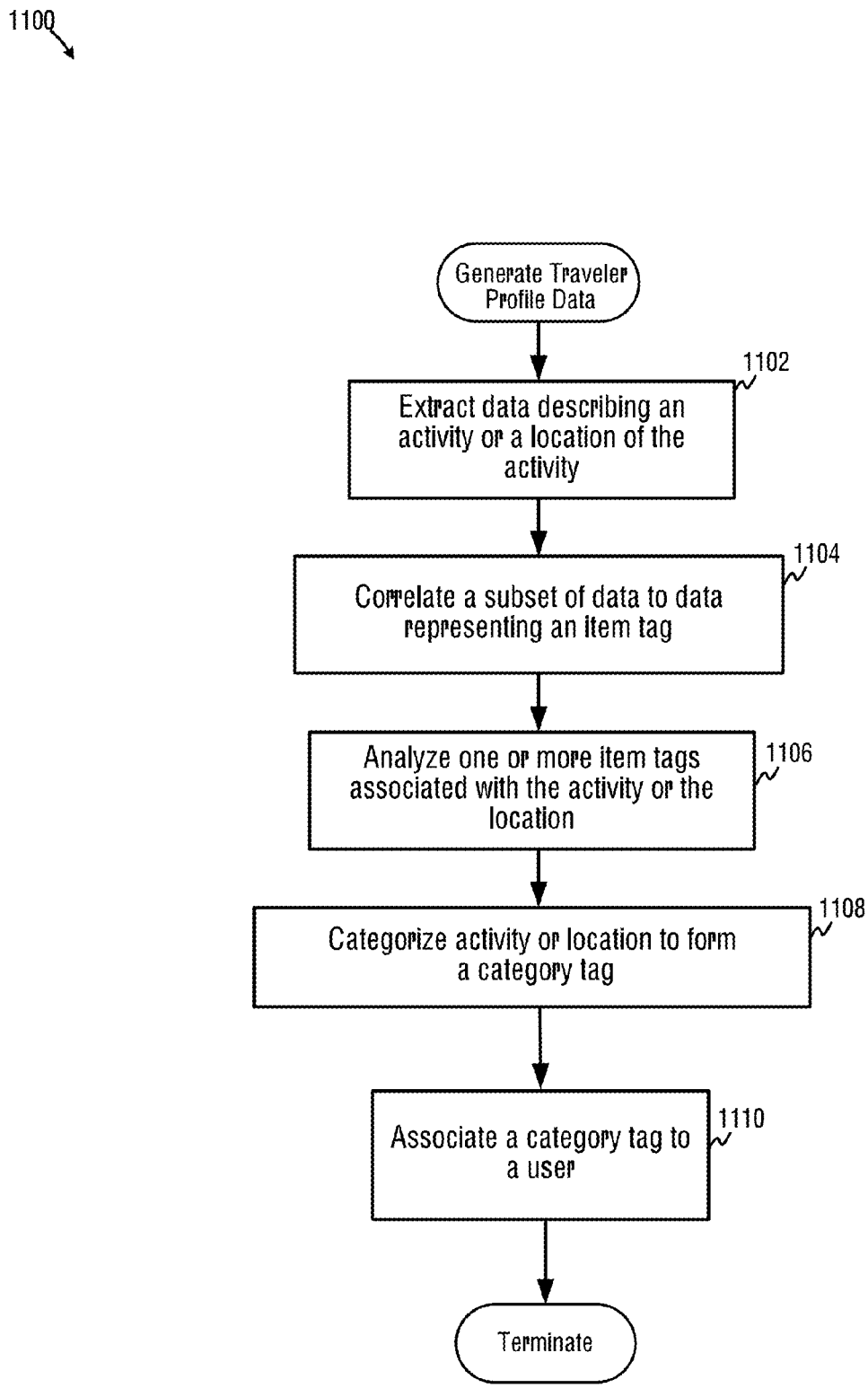
FIG. 11 is an example of a flow diagram to generate traveler profile data, according to some embodiments.

FIG. 11 is an example of a flow diagram to generate traveler profile data, according to some embodiments. At 1102, flow 1100 extracts data describing an activity or location of the activity, and correlates a subset of data to other data representing an item tag at 1104. At 1106, one or more item tags is analyzed in Association with the activity or a location of the activity, and at 1108 connectivity or location is categorized to form category tag. At 1110, a category tag is associated to a user (e.g., as a traveler attribute or a portion thereof) to facilitate searching or identifying characteristics of a traveler for purposes of predicting a next activity and generating customized advisory data to engage in the next activity.

Figure 12:
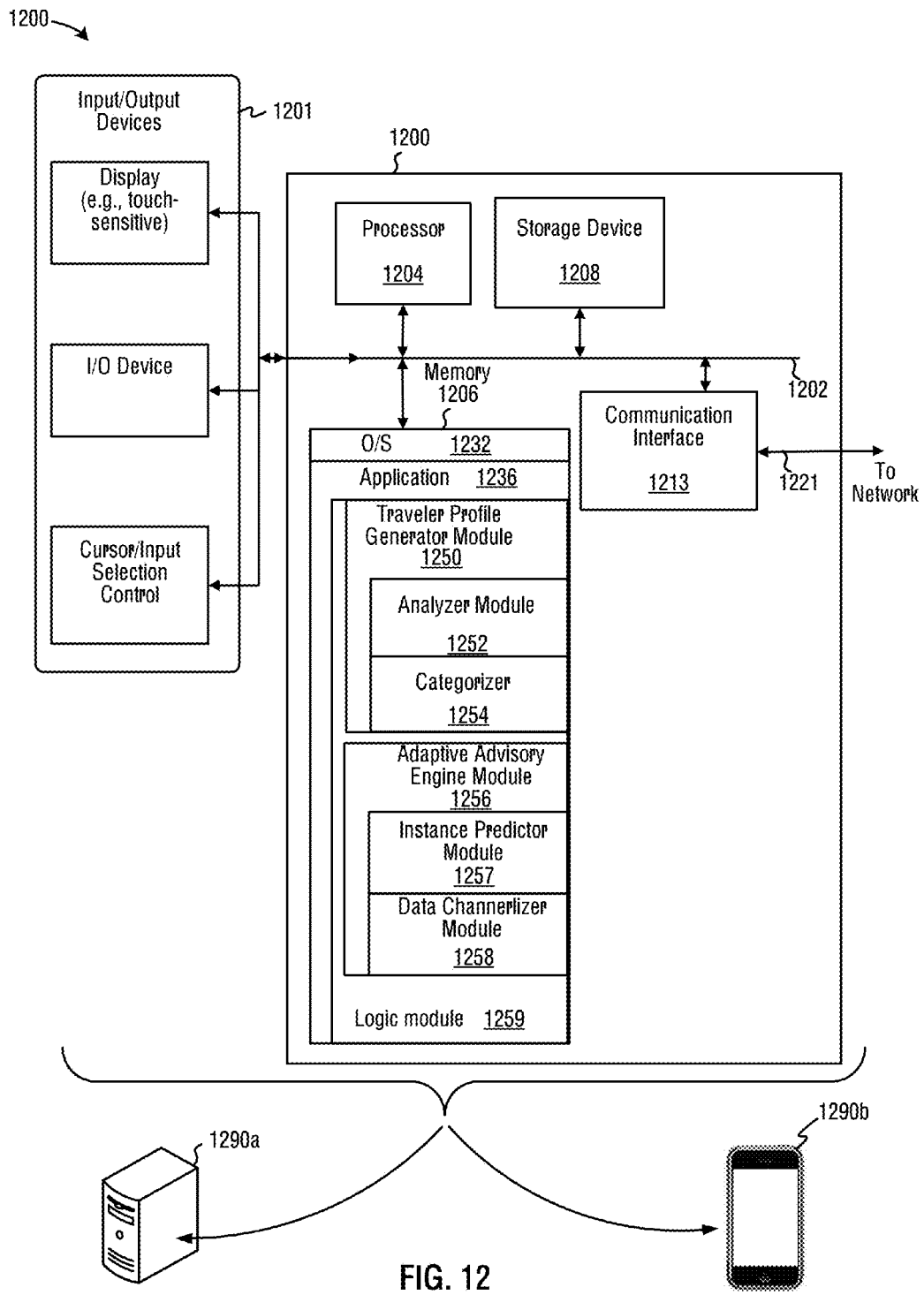
FIG. 12 illustrates an exemplary computing platform disposed in a computing system configured to facilitate changes in direction of travel based on predicted preferential activities and customized advisory data in accordance with various embodiments.

FIG. 12 illustrates an exemplary computing platform disposed in a computing system configured to facilitate changes in direction of travel based on predicted preferential activities and customized advisory data in accordance with various embodiments. In some examples, computing platform 1200 may be used to implement computer programs, applications, methods, processes, algorithms, or other software to perform the above-described techniques.

In some cases, computing platform can be disposed in wearable device or implement, a mobile computing device 1290*b*, or any other device, such as a computing device 1290*a*.

Computing platform 1200 includes a bus 1202 or other communication mechanism for communicating information, which interconnects subsystems and devices, such as processor 1204, system memory 1206 (e.g., RAM, etc.), storage device 1208 (e.g., ROM, etc.), a communication interface 1213 (e.g., an Ethernet or wireless controller, a Bluetooth controller, etc.) to facilitate communications via a port on communication link 1221 to communicate, for example, with a computing device, including mobile computing and/or communication devices with processors. Processor 1204 can be implemented with one or more central processing units ("CPUs"), such as those manufactured by Intel® Corporation, or one or more virtual processors, as well as any combination of CPUs and virtual processors. Computing platform 1200 exchanges data representing inputs and outputs via input-and-output devices 1201, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 1200 performs specific operations by processor 1204 executing one or more sequences of one or more instructions stored in system memory 1206, and computing platform 1200 can be implemented in a client-server arrangement, peer-to-peer arrangement, or as any mobile computing device, including smart phones and the like. Such instructions or data may be read into system memory 1206 from another computer readable medium, such as storage device 1208. In some examples, hard-wired circuitry may be used in place of or in combination with software instructions for implementation. Instructions may be embedded in software or firmware. The term "computer readable medium" refers to any tangible medium that participates in providing instructions to processor 1204 for execution. Such a medium may take many forms, including but not limited to, non-volatile media and volatile media. Non-volatile media includes, for example, optical or magnetic disks and the like. Volatile media includes dynamic memory, such as system memory 1206.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1202 for transmitting a computer data signal.

In some examples, execution of the sequences of instructions may be performed by computing platform 1200. According to some examples, computing platform 1200 can be coupled by communication link 1221 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 1200 may transmit and receive messages, data, and instructions, including program code (e.g., application code) through communication link 1221 and communication interface 1213. Received program code may be executed by processor 1204 as it is received, and/or stored in memory 1206 or other non-volatile storage for later execution.

In the example shown, system memory 1206 can include various modules that include executable instructions to implement functionalities described herein. System memory 1206 may include an operating system ("O/S") 1232, as well as an application 1236 and/or logic module(s) 1259. In the example shown, system memory 1206 includes a traveler profile generator module 1250 including an analyzer module 1252 and a categorizer module 1254. System memory 1206 also includes an adaptive advisory engine module 1256, which includes an instance predictor module 1257 and a data channelizer module 1258, one or more of which can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a traveler profile generator and/or an adaptive advisory engine module 1256, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with a traveler profile generator and/or an adaptive advisory engine module 1256, or one or more of their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a traveler profile generator and/or an adaptive advisory engine module 1256, or one or more of their components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a traveler profile generator and/or an adaptive advisory engine module 1256, or one or more of their components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 13:
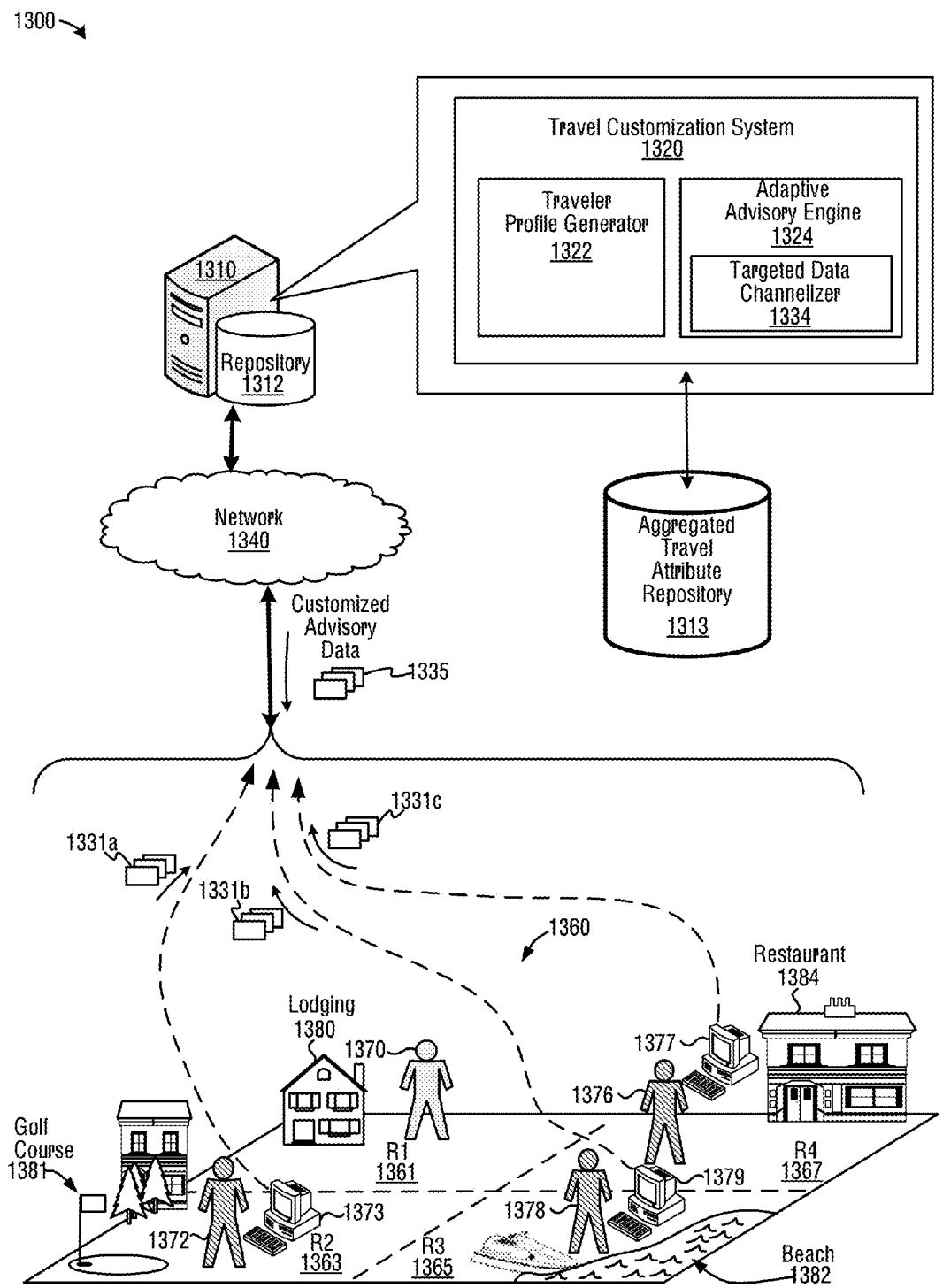
FIG. 13 is a diagram of an example of a travel customization system implementing an activity characteristic matcher, according to some embodiments.

FIG. 13 is a diagram of an example of a travel customization system implementing a targeted data channelizer, according to some embodiments. Diagram 1300 depicts a travel customization system 1320 implemented in a computing device 1310 and repository 1312. Travel customization system 1320 is shown to include a traveler profile generator 1322 and an adaptive advisory engine 1324. Note that elements depicted in diagram 1300 may include structures and/or functions as similarly-named or similarly-numbered elements in other figures described herein. Further, travel customization system 1320 is coupled via network 1340 to receive request data 1331*a*, 1331*b*, and 1331*c* and to transmit customized advisory data 1335 to a traveler 1370 associated with lodging 1380 in region 1361. Further to diagram 1300, travel customization system 1320 also includes a targeted data channelizer 1334 that may be configured to channelize a subset of travelers, including traveler 1370, to an activity based on targeted attribute data stored in, for example, aggregated travel attribute repository 1313. Therefore, travel customization system 1320 can provide a platform for proprietors offering activities, including goods or services, to target a subset of travelers that are lodging in a common geographic region 1360, thereby enabling the subset of travelers to have access to activity-specific data targeted to their interests or otherwise predict preferential activities. Note that a proprietor need not be a for-profit entity, but also may be a non-profit or government agency (e.g., a national forest park service offering information on horseback riding and hiking activities, fire-danger alerts, etc.).

In the example shown, a proprietor 1372 accesses travel customization 1320 via a computing device 1373. In this case, proprietor 1372 is an owner of a golf course 1381 in region 1363, and generates a request to communicate to travelers having travel attributes matched to activity characteristics defined in data 1331*a*. The activity characteristics may define a golfing activity. A proprietor 1376 accesses travel customization 1320 via a computing device 1377. In this case, proprietor 1376 is an owner of a restaurant 1384 in region 1367, and generates a request to communicate to travelers having travel attributes matched to activity characteristics defined in data 1331*b*. The activity characteristics may define a meal or an eatery at which the traveler may be predicted to have a meal. A proprietor 1378 accesses travel customization 1320 via a computing device 1379. In this case, proprietor 1378 is an owner of a jet ski rental shop in region 1365 (adjacent to beach 1382), and the proprietor generates a request to communicate to travelers having travel attributes matched to activity characteristics defined in data 1331*c*. The activity characteristics in data 1331*c* may define a water-based activity in which the traveler may be predicted to participate.

In view of the foregoing, targeted data channelizer 1334 is configured to determine activities for a subset of users or travelers, and is further configured to actively channelize a subset of users or travelers to specific activities associated with targeted locations. As such, travel customization system 1320 may leverage data describing traveler attributes for a pool of travelers likely inclined or predisposed to obtain certain goods and services in geographic region 1316 during their stay at lodging 1380. In some examples, targeted data channelizer 1334 can generate customized advisory data 1335 as part of a targeted search results (e.g., targeted data channelizer 1334 may facilitate targeted searching as a function of an adaptive advisory search engine 1324).

Figure 14:
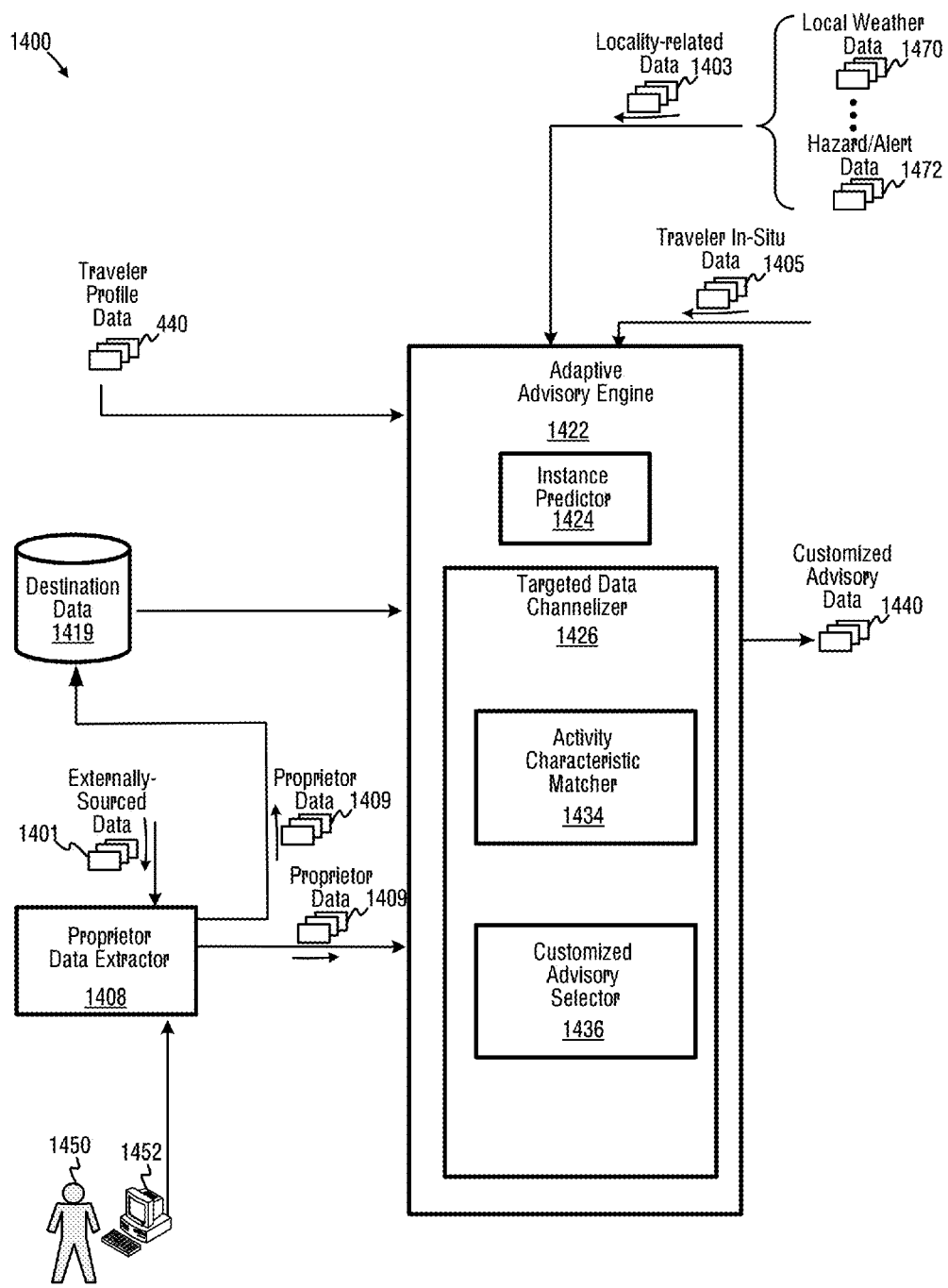
FIG. 14 is a diagram depicting an example of an adaptive advisory engine including a targeted data channelizer, according to some embodiments.

FIG. 14 is a diagram depicting an example of an adaptive advisory engine including a targeted data channelizer, according to some embodiments. Adaptive advisory engine 1422 includes an instance predictor 1424 for generating customized advisory data 1440. Further, adaptive advisory engine 1422 is configured to receive traveler profile data 440, locality-related data 1403 (e.g., including local weather data 1470 and/or hazard/alert data 1472, among others), and traveler in-situ data 1405. Note that elements depicted in diagram 1400 may include structures and/or functions as similarly-named or similarly-numbered elements in other figures described herein.

Further to diagram 1400, adaptive advisory engine 1422 may also include a targeted data channelizer 1426, which, in turn, may include an activity characteristic matcher 1434 and a customized advisory selector 1436. Targeted data channelizer 1426 operates to receive proprietor data 1409 to channelize travelers to activities or destinations associated with a particular proprietor. Proprietor data 1409 can be generated by, for example, extracting proprietor data 1408 from a digital request entered by proprietor 1450 via computing device 1452 or from externally-sourced data 1401. Proprietor data extractor 1408 may be configured to operate similar to traveler data extractor 408 of FIG. 4. Note that in some cases proprietor data 1409 may be stored as part of destination data (e.g., data describing a destination or location as a function of activity type, companion type, restaurant type, etc., or other travel attributes) in repository 1419.

According to some embodiments, data representing a request to implement data representing an identifier for a destination to generate customized advisory data for a subset of users may be received by a proprietor data extractor 1408 or adaptive advisory engine 1422. The data (e.g., proprietor data 1409) representing a request may include data defining activity characteristics at the destination associated with a geographic region. For example, data defining activity characteristics can include golfing and golfing-related characteristics, jet skiing and other water-related characteristics, and meal characteristics, including restaurant type and cuisine type. Further, adaptive advisory engine 1422 can fetch data representing traveler attributes (e.g., for a pool of travelers) as part of traveler profile data 440 and/or aggregated traveler profile data. Activity characteristic matcher 1434 may be configured to match activity characteristics (e.g., of one or more requests) against subsets of traveler attributes to identify a subset of users associated with the geographic region (e.g., in which lodging for the subset of the users resides).

Customized advisory selector 1436 may be configured to identify customized advisory data configured to cause presentation of a representation (e.g., linked or associated to the customized advisory data) to urge engagement in an activity at the destination. For example, customized advisory selector 1436 may select customized advisory data specifying "golfing," as an activity, is available at a destination coinciding with that of a proprietor. Targeted data channelizer 1426 may further be configured to transmit customized advisory data (e.g., regarding golf) to one or more mobile computing devices associated with a targeted subset of users. According to some examples, data representing a link to customized advisory data for a next activity (e.g., a targeted activity) may cause presentation of an icon configured to be displayed on a user interface of the one or more mobile computing devices. The customized advisory data can constitute advertisement information to urge participation in an activity, according to some examples.

Instance predictor 1424 may be configured to predict an activity (e.g., a next activity) based on a relationship between location coordinates at which a mobile computing device resides and a travel attribute to form data representing a predicted activity. Activity characteristic matcher 1434 may be configured to match at least an activity characteristic associated with the activity against the traveler attribute to identify a subset of the customized advisory data, whereby data representing a next link to other customized advisory data may be transmitted to a mobile computing device associated with a traveler targeted by a proprietor 1450.

According to at least one example, activity characteristic matcher 1434 may be configured to match activity characteristics against a subset of category tags, which may include data representing one or more of a trip type, an activity type, a meal type, a lodging type, and a companion type. Further, activity characteristic matcher 1434 may operate to detect a match between an activity characteristic and one or more category tags, and customized advisory selector 1436 may be configured to select an electronic message to transmit to a mobile computing device to thereby channelize the electronic message to a traveler associated with the mobile computing device. In at least one example, customized advisory selector 1436 may determine a degree of relevancy for two or more category tags (e.g., two or more category tags including a trip type, a activity type, a meal type, a lodging type, and a companion type) and select an electronic message to transmit to the mobile computing device based on the degree of relevancy.

By reserving one or more category tags, for example, to target specific travelers, a proprietor may reserve access to the specific travelers. Thus, other proprietors are restricted in their ability to access specific travelers associated with the reserved one or more category tags. In view of the foregoing, a targeted channelizer 1426 can facilitate a merchant advertising platform configured to target travelers as interested parties.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and/or otherwise distributed among any number of elements.

Figure 15:
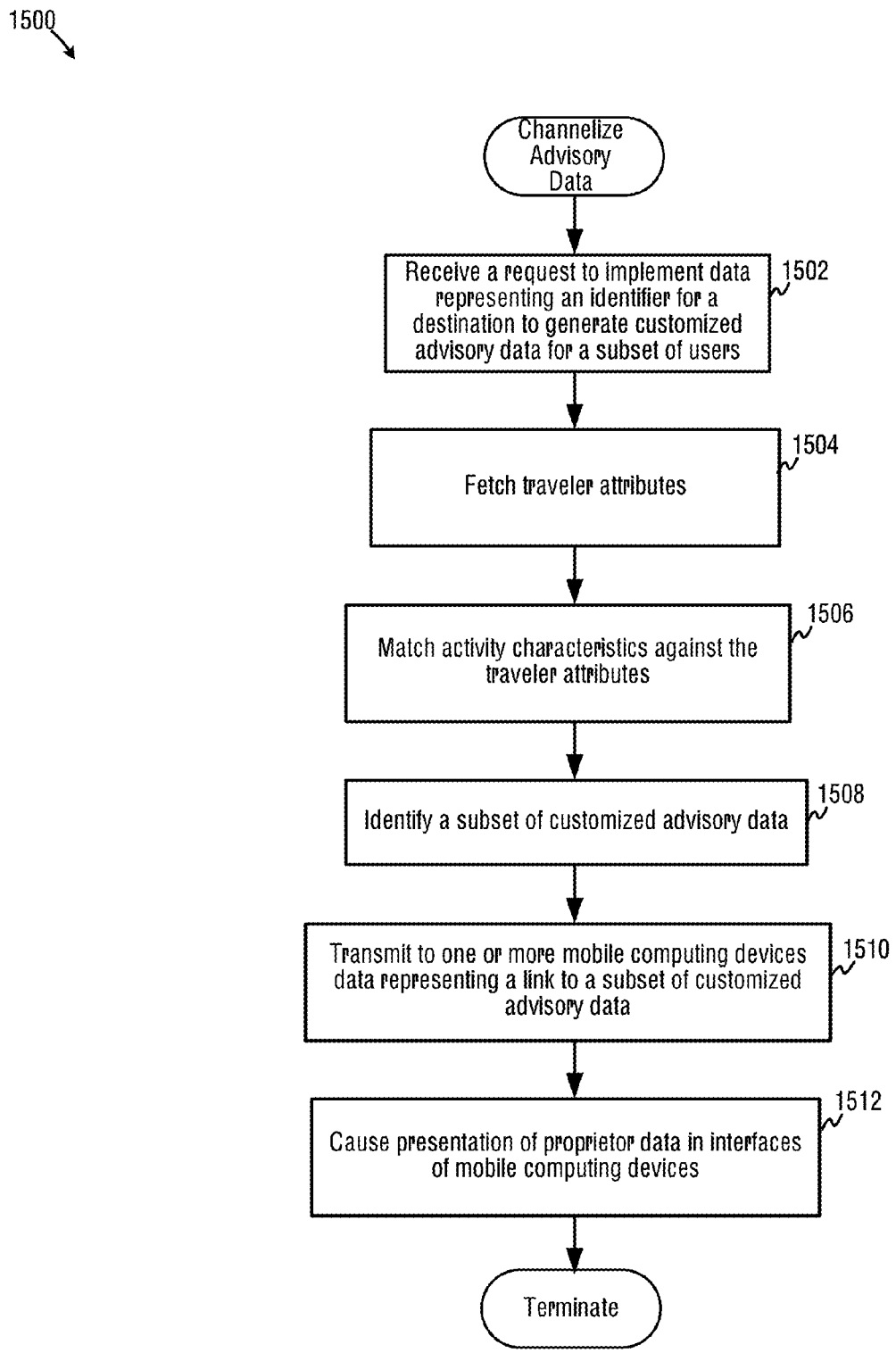
FIG. 15 is an example of a flow diagram to channelize custom advisory data, according to some embodiments.

FIG. 15 is an example of a flow diagram to channelize custom advisory data, according to some embodiments. At 1502, flow 1500 begins with receiving a request to implement data representing an identifier for a destination to generate customized advisory data for a subset of users. The identifier may uniquely identify a proprietor or particularly-hosted activity or event. At 1504, traveler attributes are fetched, and activity characteristics are matched against traveler attributes at 1506. At 1508, a subset of customized advisory data is identified. For example, customized advisory data may inform a targeted subset of travelers of a golf activity available at a golf course location. At 1510, data representing a link (e.g., data representing an association or location at which to find data) to customized advisory data is transmitted to one or more mobile computing devices, and presentation of proprietor data may be displayed on interfaces of mobile computing devices at 1512.

Figure 16:
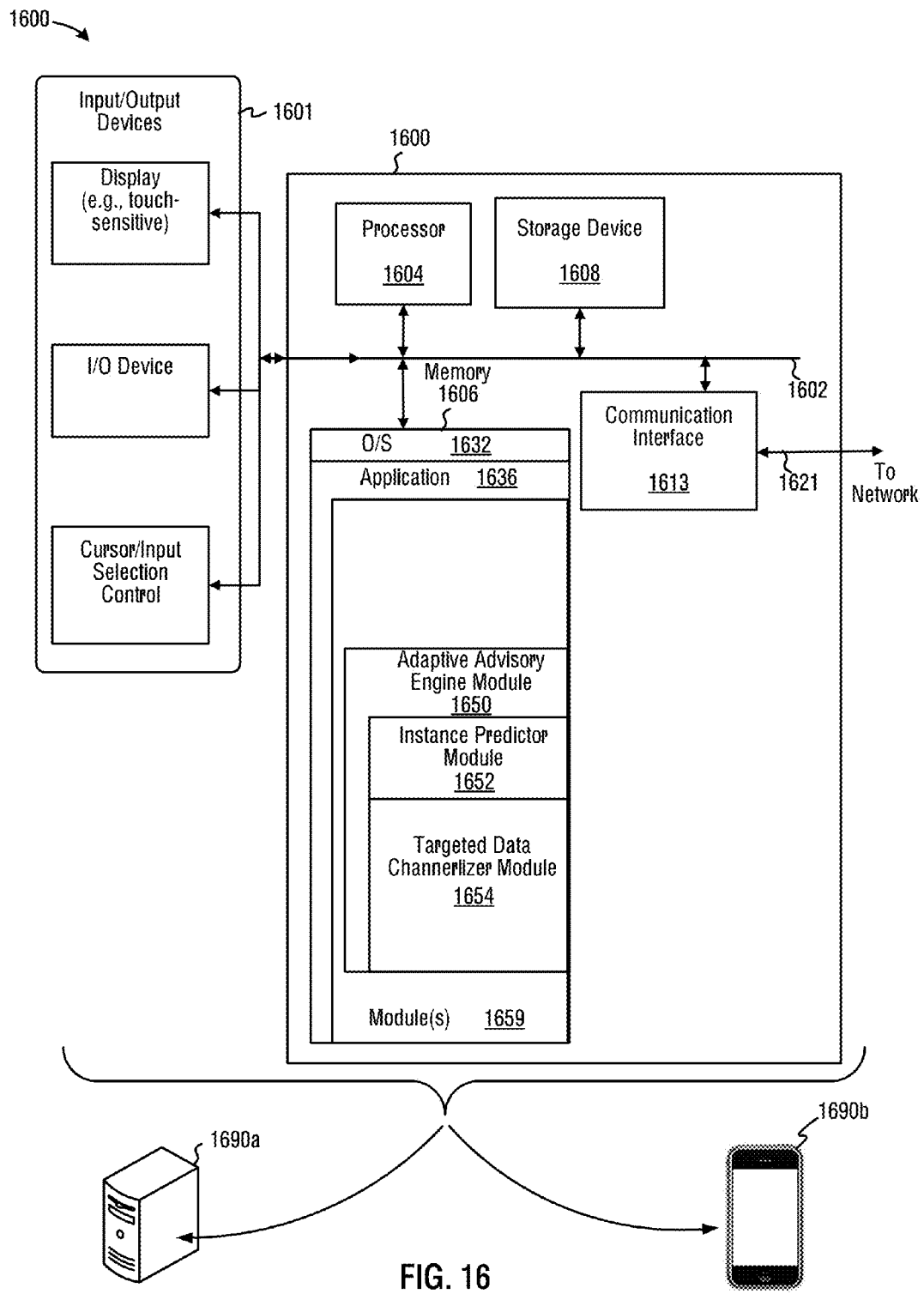
FIG. 16 illustrates an exemplary computing platform disposed in a computing system configured to facilitate changes in direction of travel based on predicted preferential activities defined by targeted customized advisory data in accordance with various embodiments.

FIG. 16 illustrates an exemplary computing platform disposed in a computing system configured to facilitate changes in direction of travel based on predicted preferential activities defined by targeted customized advisory data in accordance with various embodiments. In some examples, computing platform 1600 may be used to implement computer programs, applications, methods, processes, algorithms, or other software to perform the above-described techniques. In some cases, computing platform can be disposed in wearable device or implement, a mobile computing device 1690*b*, or any other device, such as a computing device 1690*a*. Note that elements depicted in diagram 1600 may include structures and/or functions as similarly-named or similarly-numbered elements in other figures (e.g., FIG. 12) described herein. In the example shown, system memory 1606 includes an adaptive advisory engine module 1650, which includes an instance predictor module 1652 and a targeted data channelizer module 1654, one or more of which can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and/or otherwise distributed among any number of elements.

Figure 17:
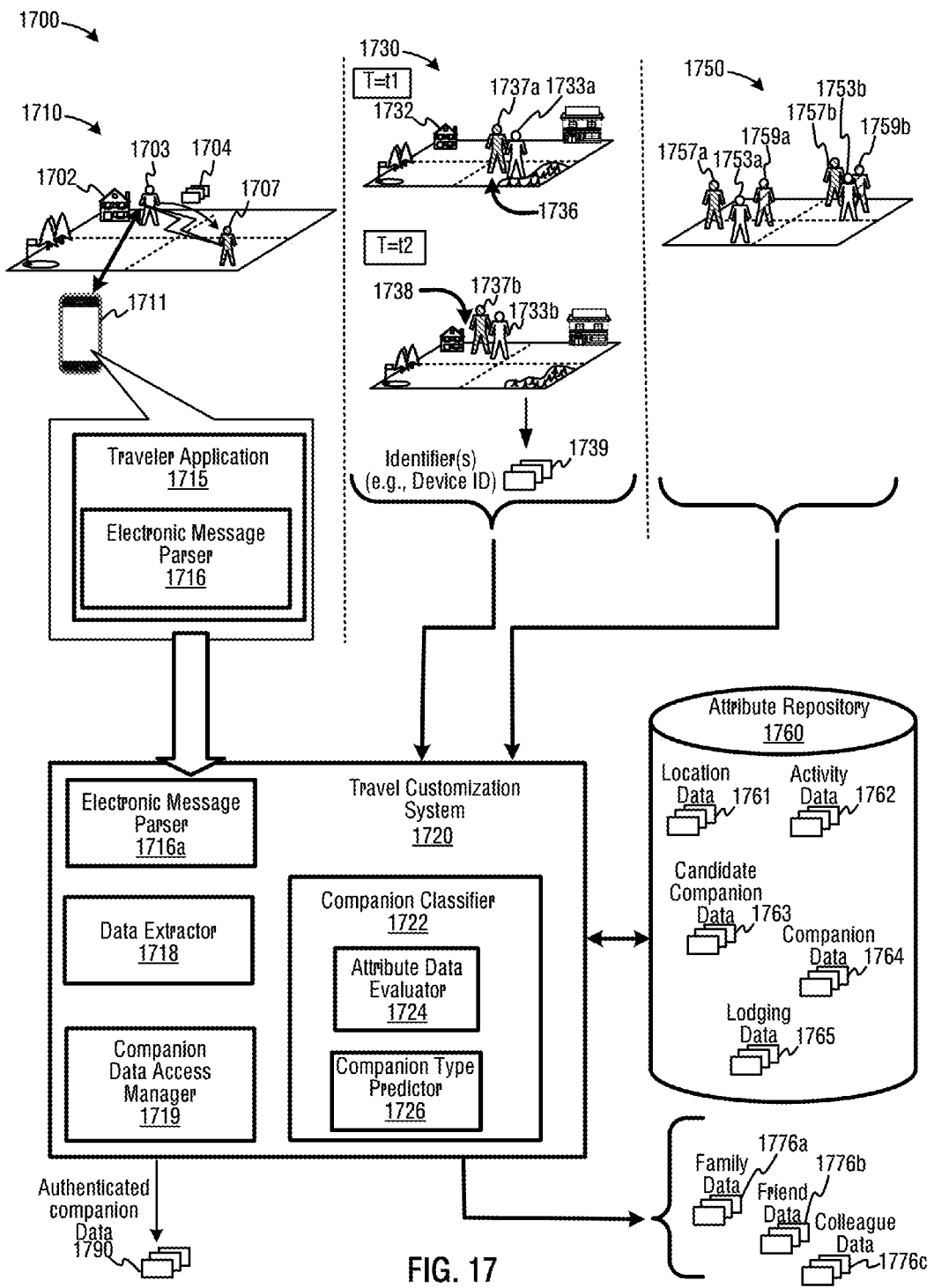
FIG. 17 is a diagram depicting a travel customization system including an example of a companion classifier, according to some embodiments.

FIG. 17 is a diagram depicting a travel customization system including an example of a companion classifier, according to some embodiments. Diagram 1700 depicts a travel customization system 1720 that may be implemented in a computing device and a repository, such as in a networked Web server-based system or in a mobile computing device. Travel customization system 1720 is shown to include companion classifier 1722, which, in turn, includes an attribute data evaluator 1724 configured to evaluate a number of travel attributes that may be used to determine a companion type, and a companion type predictor 1726 configured to predict a type of companion based on the evaluation of the travel attributes. Note that one or more elements depicted in diagram 1700 may include structures and/or functions as similarly-named or similarly-numbered elements in other figures described herein.

According to some examples, companion classifier 1722 may be configured to determine a companion type describing a relationship of a companion to a traveler such that a candidate companion may be accompanying a traveler, such as during a vacation or business trip, at a particular geographic region in which the traveler has secured lodging. In various examples, lodging may include a rental property, such as a rented home or condominium, whereby companions of a traveler may be determined to be of one or more companion types. Examples of companion types include data representing one or more of familial relationships, friend or acquaintance-based relationships, and collegial relationships. According to some examples, a companion type that is determinable may facilitate determining an activity in which a traveler is engaged, as well as predicting a next activity based on the relationships of individuals with whom the traveler is traveling. Further, companion classifier 1722 also may be configured to authorize a companion and/or companion computing device to access a private, secure data network that includes, or otherwise is associated with, travel customization system 1720. An example of a travel customization system 1720 includes a platform configured to manage rental of properties, such as provided by HomeAway, Inc., of Austin, Tex. By ascertaining that a traveling companion is of a companion type, such as a family member (e.g., a spouse), access to travel customization system 1720 may be granted based on the companion type. Various degrees of access also may be determined based on a companion type. For example, a traveler that is traveling on a business trip along with family members may wish to give family members full privileges and access, whereas the traveler may only wish to provide limited access (e.g., information regarding lodging or local activities) to business colleagues with whom the traveler is traveling.

Attribute data evaluator 1724 is configured to identify a candidate companion (e.g., an individual as a traveling companion and/or a mobile computing device associated with individual) and to evaluate data representing various travel attributes that may be used to describe or otherwise predict a type of companion that describes a relationship to the candidate companion. Attribute data evaluator 1724 is configured to receive data from a number of data sources, including a mobile computing device implementing an application (e.g., a traveler application 1715) configured to capture data representing travel attributes for transmission to travel customization system 1720. Attribute data evaluator 1724 may also be configured to correlate data representing travel attributes, format the data for storage in attribute repository 1760, and control access to various types of data in attribute repository 1760. For example, attribute repository 1716 may include traveler profile data and may be used to store location data 1761 (e.g., location data associated with travelers, companions (i.e., known companions), candidate companions, and other attributes), activity data 1762 (e.g., activity data associated with travelers, companions (i.e., known companions), candidate companions, and other attributes), candidate companion data 1763, companion data 1764, and lodging data, 765, among other types of data. Each portion of data in data files for each of the data types described above may be associated or otherwise linked to each other for predicting companion types.

To illustrate operation of companion classifier 1722, consider the following examples. In a first example, consider that a user 1703 is staying at a rental house 1702 disposed in a geographic region 1710. User 1703 may initiate transmission of data 1704, which represents an electronic message 1704, at a mobile computing device 1711 for delivery to a candidate companion 1707. Examples of such electronic messages include telephonic text messages (e.g., SMS messages), emails, and the like. As the case may be, user 1703 typically transmits or otherwise initiates communications relevant to geographic location 1710 to other individuals, including candidate companion 1707. An electronic message parser 1716 is configured to parse, for example, through strings of text to identify and/or tag relevant words, terms, or other symbols relevant to lodging 1702 or geographic region 1710. For example, information about local activities recommendations may be available to user 1703 via network connection to travel customization system 1720. A local activity may include playing golf. When user 1703 transmits an electronic message describing an activity of playing golf including location, the name of a golf course, the time of day, and the like, electronic message parser 1716 may capture a copy of the electronic message for parsing and detecting golf-related words or symbols. Note that while in this example, electronic message parser 1716 may be disposed in a mobile computing device 1711, the electronic message parser may be disposed in a travel customization system 1720 as electronic message parser 1716a.

Data extractor 1718 of travel customization system 1720 may be configured to extract other data (e.g., metadata or the like) from a parsed electronic message or portions thereof. For example, data extractor 1718 may extract data representing data describing a destination device, such as a telephonic number (e.g., a cell phone number) associated with candidate companion 1704, an email address associated with candidate companion 1704, and the like. Attribute data evaluator 1724 may be configured to match data representing the telephonic number or email address against data in attribute repository 1760. For instance, such identifier data may be matched against companion data 1764, which includes data representing known companions and associated companion types as well as other attributes of a companion, including telephone numbers, email addresses, activity types in which the companion participates, etc. In one example, if a traveler has golfed with companion 1707 during a prior trip, companion data 1764 may include an identity for companion 1707 and a companion type, which may be identified via a data value representing a "colleague" companion type. In other instances, attribute data evaluator 1724 may not readily determine a match to data in attribute repository 1760. As such, parsed and extracted data from electronic message 1704, as well as relevant data from attribute repository 1760, may be transmitted to companion type predictor 1726.

Companion type predictor 1726 may execute instructions to determine the likelihood that at least one companion type is more likely or probable than other companion types. According to some examples, companion type predictor 1726 may calculate data representing a ranking or numeric probability that one of the following companionship types is more probable than the others: a familial relationship to user 1703, a friend relationship to user 1703, and a collegial relationship to user 1703. In one instance, companion type predictor 1726 may select as the companionship type a highest numeric probability relative to the other companion types. A probability associated with each of companion types may be computed similar to that described in FIG. 8, according to some examples. For example, lodging data 1765 of FIG. 17 may include data representing devices coupled to a Wi-Fi-enabled router of a rented house 1702 and relevant device identifiers, such as MAC IDs, that list devices present within a lodging of traveler 1703. If a computing device associated with candidate companion 1707 is absent in the list of identifiers, then candidate companion 1707 may be less likely to be a family member or friend and more likely to be a colleague. Further, if activity data 1762 and companion data 1764 indicates that traveler 1703 plays golf during business trips and with friends, a value representing the likelihood that candidate companion 1707 is a family member is decreased. Other like attribute data may be used to further refine the probability determination, according to other embodiments.

In a second example, consider that a user 1733a is staying at a rental house 1732 disposed in a geographic region 1730. User 1733a may engage in an activity along with a candidate companion 1737a, or user 1733a may be co-located in an area at which candidate companion 1737a is located. As such, location data representing location coordinates indicating a location 1736 (e.g., location coordinates indicate a beach) may be transmitted to companion classifier 1722. According to some examples, a traveler application implemented on a mobile computing device (not shown) accompanying user 1733a may be configured to electronically capture data representing identifiers and locations adjacent user 1733a. For example, the traveler application may be configured to receive MAC addresses as identifiers, BlueTooth® addresses or other device names/identifiers, Near Field Communication ("NFC")-related identifiers, etc. Further, companion classifier 1722 may also receive timestamp-related information specifying the time at which a location coordinate was transmitted by mobile computing device and/or data representing a presence of a candidate companion 1737a. For example, device identifiers (e.g., a Bluetooth address) for candidate companion 1737a may be received as data 513 of FIG. 5, along with timestamp data 511 and location coordinate data 512. Patterns of such information, which can be correlated with other information, may be used by a companion classifier to identify companion type for a candidate companion.

Referring back to FIG. 17, attribute data evaluator 1724 may be configured to analyze data of attribute repository 1760, including activity data 1762 and lodging data 1765, to identify a companion type based on an activity or a pattern of activities, along with location data that can be used to identify a name of a location or a type of activity that occurs at a location (e.g., a golf course is a location at which a golfing activity occurs). For example, consider that an activity of "beach-going" coincides with location 1736, and, as such, attribute data evaluator 1724 determines that candidate companion 1737a and user 1733a are participating in the activity of "beach-going." Also, attribute data evaluator 1724 receives device ID data 1739, which identifies, for example, a mobile computing device associated with candidate companion 1737a. Companion type predictor 1726 may evaluate the above-described data as well as data in attribute repository 1760 to predict data representing a first companionship type for candidate companion 1737a based on the activity at location 1736. In one case, companion classifier 1722 may determine data identifying one or more companion types associated with the activity, and select a first companionship type from the one or more companion types (e.g., select a family type). Further, companion classifier 1722 may associate the first companionship type to a computing device associated with candidate companion 1737a. For example, companion classifier 722 may associate a "family" companion type to a mobile phone or computing device that accompanies a spouse of user 1737a.

Further, companion type predictor 1726 may analyze other data to enhance a probability determination for a companion type. As shown in diagram 1700, user 1733a moves as user 1733b to a location 1738 including lodging 1732. Similarly, candidate companion 1737a moves as candidate companion 1737b to location 1738. Based on this data, companion type predictor 1726 may be configured to determine whether a companion type is associated with companions identified in companion data 1764 that may have engaged in the same activities, as described in activity data 1762. For example, attribute repository 1716 may include data indicating that companions that accompany the user 1733 to a beach and return together to lodging 1732 are associated with a relatively high probability (e.g., 80%, or greater) that candidate companion 1737 is a family member. As such, companion classifier 1722 can classify candidate companion 1737b as a family member, and, as such, future activities and events may be predicted based on a family member accompanying user 1733 to a location.

In some cases, data extractor 1718 may extract data representing an identifier (e.g., via Wi-Fi or other wireless data signals) associated with a computing device associated with candidate companion 1737b. Companion classifier 1722 may calculate that the computing device associated with candidate companion 1737b is within a region coterminous with location 1738 by computing an amount of power signal magnitude that is within a threshold range of power signal magnitudes. The power signal threshold can correlate to the relative distance between user 1733b and candidate companion 1737b. As such, a magnitude of power can be computed and used to determine a companion type. For example, companion classifier 1722 may determine a value representing a received signal strength indicator ("RSSI") associated with a communications link (e.g., between a candidate computing device and a user computing device). In some cases, lower values of signal power indicate a relative high likelihood that candidate companion 1737 is not likely residing, for example, in the same condominium as user 1733, but may be residing in a neighboring condominium. By contrast, relatively higher values of signal power may indicate a relatively higher likelihood that candidate companion 1737 is a family member, especially if lodging data 1765 indicates that user 1733 has yet to share a condominium with any other companion type other than family member.

In a third example, consider that a user 1753*a* is staying at a rental house in a geographic region 1750, and further is engaging in an activity along with a candidate companion 1757*a* and a companion 1759*a*. In some cases, a term "companion" may refer to an individual or an individual's computing device for which a companion type is known and/or stored in companion data 1764, according to some examples. Further consider that user 1753*a*, candidate companion 1757*a*, and companion 1759*a* are participating in an activity at a determinable location. Attribute data evaluator 1724 may access data in attribute repository 1760 to determine a companion type for companion 1759 in the context of the engaging in a common activity (e.g., playing golf). Thus, companion type predictor 1726 may associate candidate companion 1757*a* to data (e.g., a tag) that indicates a colleague type of companion based on companion 1759*a* being of a "colleague type" of companion. Note that companion classifier 1722 may further enhance the reliability and/or accuracy of its predictions by determining a pattern companionship over different activities. For example, consider user 1753*a*, candidate companion 1757*a*, and companion 1759*a* move to another location to participate in a different activity together as user 1753*b*, candidate companion 1757*b*, and companion 1759*b*. Consider that the activity associated with the latest location is one user 1753*b* engages (or has engaged) with colleagues. Thus, the earlier classification of candidate companion 1757*a* as a colleague may be validated. But if the latest location coincides with an activity that user 1753*b* typically participates with family members, then companion type predictor 1726 may deemphasize or otherwise cause reclassification of candidate companion 1757*b*. Additional information may be required to ensure accurate determinations of companion types.

In some examples, traveler application 1715 may be configured to log data representing an instance in which a candidate companion is at one or more locations (e.g., including the location at which the user is disposed over a number of time intervals). In some cases this may be during a trip and during pre-arrival intervals of time. For example, traveler application 1715 may be configured to capture device identifiers of the members of the family prior to a travel date by accessing network-related data at a home network (e.g., MAC IDs of family members' devices). Note that friends may also have their devices registered on the home network. However, a friend's computing device accesses the home network less than family members, and, as such, the frequency of connection to a home network may indicate a probability or a value indicating whether a device identifier relates to a friend's computing device or a family member's computing device. Therefore, such identifiers may be used in place of lodging to determine which family members are present and whether different device identifiers may indicate the presence of friends or colleagues.

Companion data access manager 1719 is configured to receive family data 1776*a* indicating a companion as family, friend data 1776*b* indicating a companion as a friend, and colleague data 1776*c* indicating a companion as a colleague. In some cases, one or more of the above-types of companion may have access to authenticated companion data 1790, which may include data ranging from access codes (e.g., electronic key codes) to enter a rental unit or access a wireless network therein. In other cases, different degrees or amounts of data available as authenticated companion type data 1790 may restrict different amounts of information based on a companion type. For example, a family member may have an increased amount of access to travel customization system 1720 (e.g., information regarding a rental unit, local recommendations and activities, as well as confidential information), whereas colleagues may be restricted to no or little information (e.g., information such as a general area—without a specific address—in which the lodging is located).

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and/or otherwise distributed among any number of elements.

Figure 18:
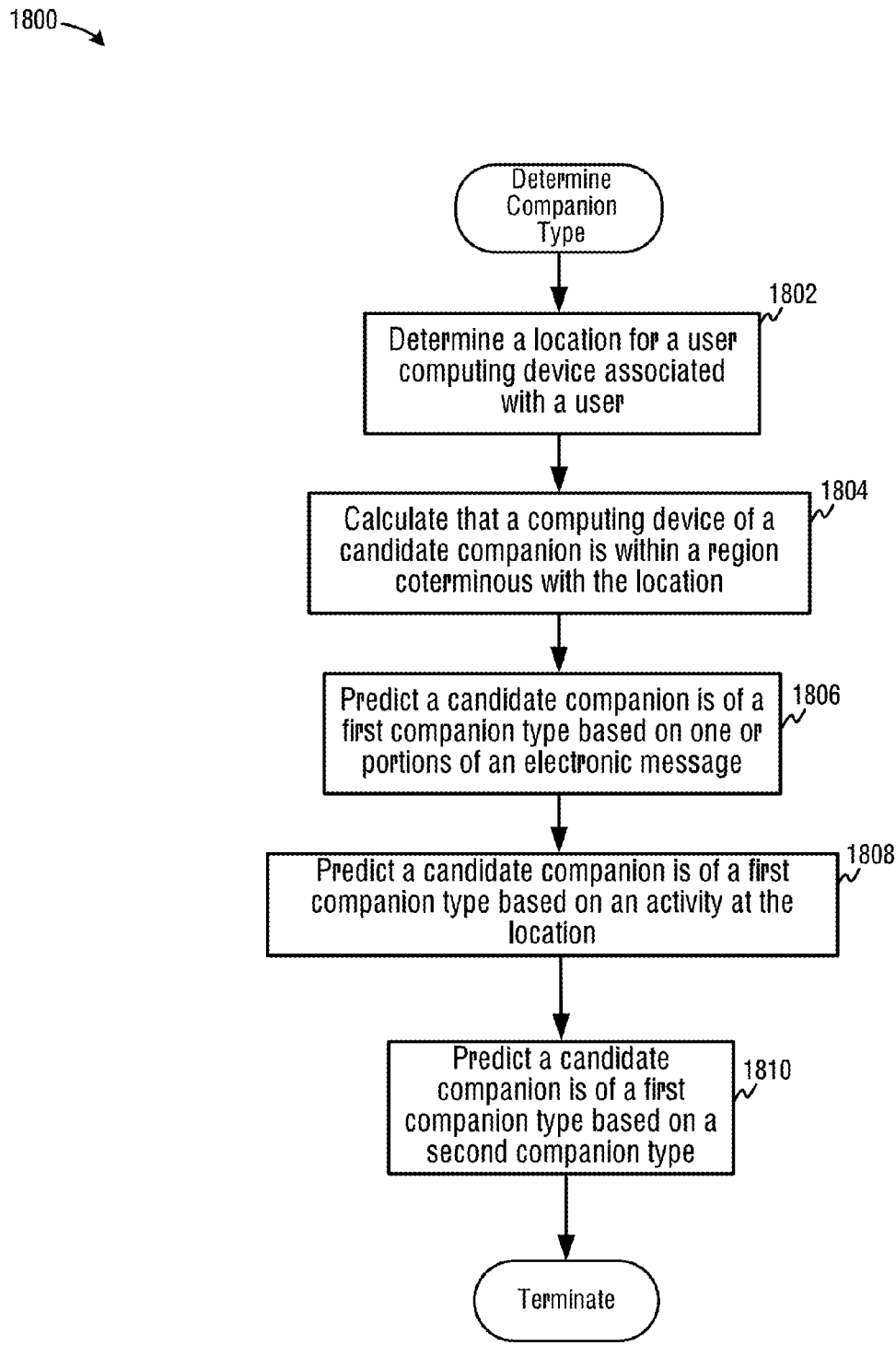
FIG. 18 is an example of a flow diagram to determine a companion type to predict preferential activities of the traveler, according to some embodiments.

FIG. 18 is an example of a flow diagram to determine a companion type to predict preferential activities of the traveler, according to some embodiments. At 1802, flow 1800 begins with determining a location for a user computing device associated with a user. In some cases, location data may be used to determine an activity or activities that may occur, or the user has engaged in, at the location. At 1804, a computing device of a candidate companion can be calculated to be within a region coterminous with a location at which a user is present. At 1806, a candidate companion may be predicted as being of a first companion type based on one or portions of an electronic message. At 1808, a candidate companion may be predicted as being of a first companion type based on an activity at the location. At 1810, a candidate companion may be predicted as being of a first companion type based on a second companion type.

Figure 19:
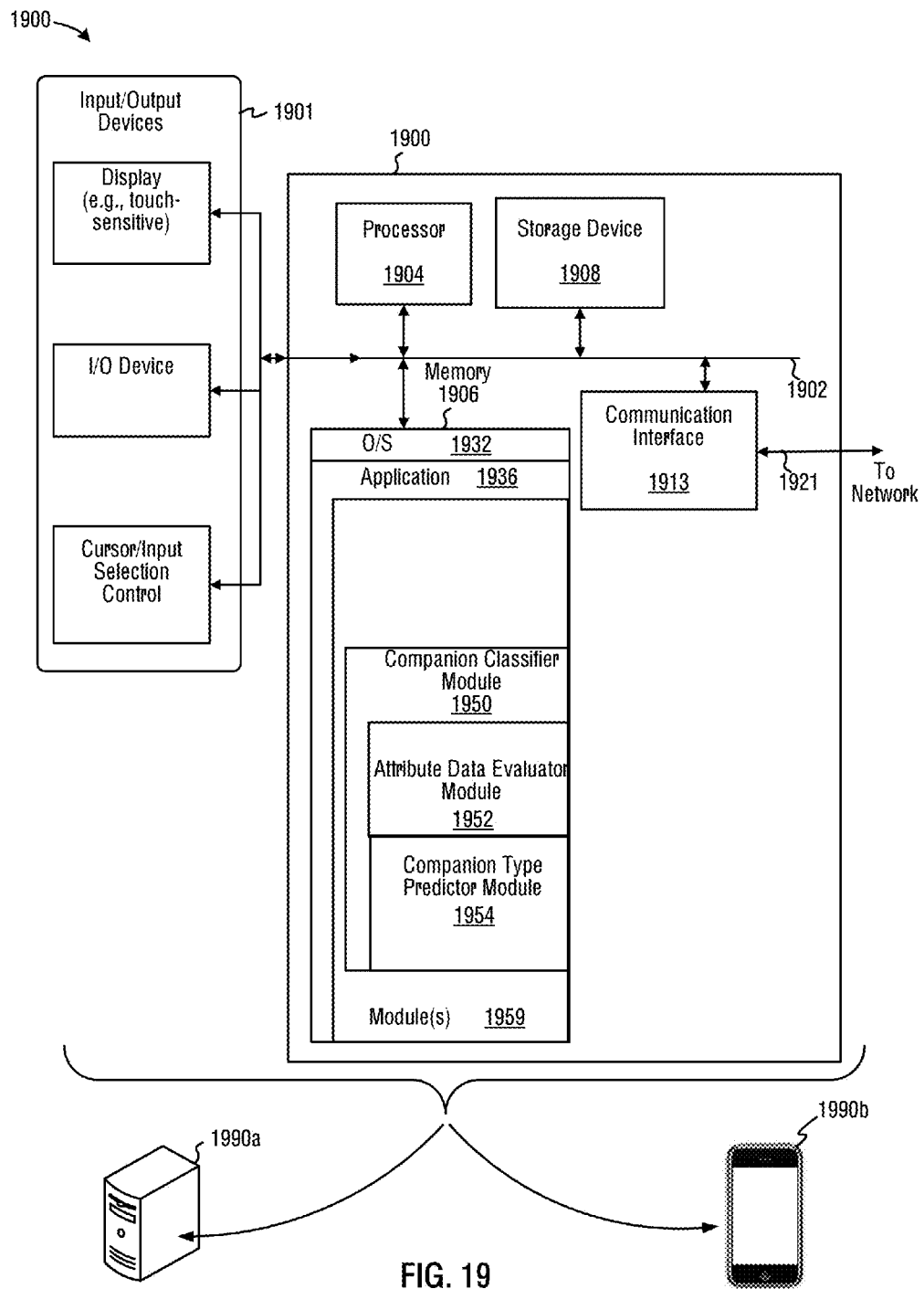
FIG. 19 illustrates an exemplary computing platform disposed in a computing system configured to facilitate changes in direction of travel based on predicted preferential activities defined by targeted customized advisory data in accordance with various embodiments.

FIG. 19 illustrates an exemplary computing platform disposed in a computing system configured to facilitate changes in direction of travel based on predicted preferential activities defined by targeted customized advisory data in accordance with various embodiments. In some examples, computing platform 1900 may be used to implement computer programs, applications, methods, processes, algorithms, or other software to perform the above-described techniques. In some cases, computing platform can be disposed in wearable device or implement, a mobile computing device 1990*b*, or any other device, such as a computing device 1990*a*. Note that elements depicted in diagram 1900 may include structures and/or functions as similarly-named or similarly-numbered elements in other figures (e.g., FIG. 12 and/or FIG. 16) described herein. In the example shown, system memory 1906 includes an opinion classifier module 1950, which includes an attribute data evaluator module 1952 and a companion type predictor module 1954, one or more of which can be configured to provide or consume outputs to implement one or more functions described herein In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and/or otherwise distributed among any number of elements.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A computer-implemented method, as implemented by a computing device including a processor configured with computer-executable instructions, the computer-implemented method comprising:
   obtaining, during a time period that a user is authorized to access a lodging unit, an electronic message generated at a computing device associated with the user;
   extracting from the electronic message data identifying a companion computing device to which the electronic message is directed, the companion computing device associated with a candidate companion;
   determining a location at which a user computing device associated with the user is disposed;
   calculating that the companion computing device associated with the candidate companion is within a region coterminous with the location;
   determining, based at least in part on the location, a first activity in which the candidate companion and the user are predicted to be participating;
   predicting a first companionship type indicative of a relationship between the user and the candidate companion based at least in part on the electronic message, the location, and the first activity;
   determining, based at least in part on the first companionship type, a second activity predicted to be of interest to the user and the candidate companion; and
   transmitting a notification to the user computing device identifying the second activity.

2. The computer-implemented method of claim 1, wherein the first companionship type indicates one or more of a familial relationship, a friend relationship, or a collegial relationship between the user and the candidate companion.

3. The computer-implemented method of claim 1, wherein extracting the data comprises extracting an email address associated with the candidate companion or a telephonic number associated with the candidate companion.

4. The computer-implemented method of claim 3, further comprising:
   associating the the email address or the telephonic number with the first companionship type.

5. The computer-implemented method of claim 1, wherein extracting the data comprises extracting an identifier associated with the computing device associated with the candidate companion.

6. The computer-implemented method of claim 5, wherein calculating that the companion computing device associated with the candidate companion is within the region coterminous with the location comprises computing an amount of power signal magnitude that is within a threshold range of power signal magnitudes.

7. The computer-implemented method of claim 6, further comprising determining the amount of power signal magnitude as a received signal strength indicator ("RSSI") associated with a communications link between the companion computing device and the user computing device.

8. The computer-implemented method of claim 1, further comprising:
   determining one or more companion types associated with the activity;
   selecting the first companionship type from the one or more companion types; and
   associating the first companionship type and the companion computing device associated with the candidate companion.

9. The computer-implemented method of claim 1, wherein predicting the first companionship type indicative of the relationship between the user and the candidate companion based at least in part on the electronic message, the location, and the first activity, comprises:
   calculating numeric probabilities that the relationship between the user and the candidate companion is a familial relationship, a friend relationship, and a collegial relationship; and
   selecting the first companionship type based at least in part on the respective numeric probabilities.

10. The computer-implemented method of claim 1, wherein predicting the companionship type further comprises:
    detecting that an additional companion is at the location;
    determining a second companionship type associated with the additional companion, the second companionship type indicative of a relationship between the user and the additional companion; and
    selecting the first companionship type based on the second companion type.

11. The computer-implemented method of claim 1 further comprising logging, over a period of time, data indicating one or more locations of the candidate companion, the one or more locations including the location at which the user is disposed wherein the first companionship type is further predicted based on the frequency of the logged data over the period of time.

12. A device comprising:
    a memory including computer-executable instructions;
    a processor in communication with the memory and configured to execute the computer-executable instructions, wherein execution of the computer-executable instructions causes the processor to;
      obtaining, during a time period that a user is authorized to access a lodging unit, an electronic message generated at a computing device associated with the user;
      extract from the electronic message data identifying a companion computing device to which the electronic message is directed, the companion computing device associated with a candidate companion;
      determine a location at which a user computing device associated with the user is disposed,
      calculate that the companion computing device associated with the candidate companion is within a region coterminous with the location;
      determine, based at least in part on the location, a first activity in which the candidate companion and the user are predicted to be participating; and
      predict a first companionship type indicative of a relationship between the user and the candidate companion based at least in part on the electronic message, the location, and the first activity;
      determine, based at least in part on the first companionship type, a second activity predicted to be of interest to the user and the candidate companion; and
      transmit a notification to the user computing device identifying the second activity.

13. The device of claim 12, wherein the execution of the computer-executable instructions further causes the processor to select the first companionship type from one or more companion types associated with the activity.

14. The device of claim 12, wherein execution of the computer-executable instructions further causes the processor to:
- detect that an additional companion is at the location;
- determine a second companionship type associated with the additional companion, the second companionship type indicative of a relationship between the user and the additional companion; and
- select the first companionship type based on the second companion type.

15. The device of claim 12, wherein execution of the computer-executable instructions further causes the processor to:
- calculate numeric probabilities that the relationship between the user and the candidate companion is a familial relationship, a friend relationship, and a collegial relationship; and
- selecting the first companionship type based at least in part on the respective numeric probabilities.

16. Non-transitory computer-readable media including computer-executable instructions that, when executed by a computing system, cause the computing system to:
- obtain, during a time period that a user is authorized to access a lodging unit, an electronic message generated at a computing device associated with the user;
- extract from the electronic message data identifying a companion computing device to which the electronic message is directed, the companion computing device associated with a candidate companion;
- determine a location at which a user computing device associated with the user is disposed;
- calculate that the companion computing device associated with the candidate companion is within a region coterminous with the location;
- determine, based at least in part on the location, a first activity in which the candidate companion and the user are predicted to be participating;
- predict a first companionship type indicative of a relationship between the user and the candidate companion based at least in part on the electronic message, the location, and the first activity;
- determine, based at least in part on the first companionship type, a second activity predicted to be of interest to the user and the candidate companion; and
- transmit a notification to the user computing device identifying the second activity.

17. The non-transitory computer-readable media of claim 16, wherein the computer-executable instructions further cause the computing system to select the first companionship type from one or more companion types associated with the activity.

18. The non-transitory computer-readable media of claim 16, wherein the computer-executable instructions further cause the computing system to:
- detect that an additional companion is at the location;
- determine a second companionship type associated with the additional companion, the second companionship type indicative of a relationship between the user and the additional companion; and
- select the first companionship type based on the second companion type.

* * * * *